US009175150B2

(12) United States Patent
Rumpf et al.

(10) Patent No.: US 9,175,150 B2
(45) Date of Patent: Nov. 3, 2015

(54) MODIFIED CARBON BLACKS HAVING LOW PAH AMOUNTS AND ELASTOMERS CONTAINING THE SAME

(71) Applicant: Cabot Corporation, Boston, MA (US)

(72) Inventors: Frederick H. Rumpf, Billerica, MA (US); Michael D. Morris, Billerica, MA (US); James A. Belmont, Billerica, MA (US)

(73) Assignee: Cabot Corporation, Boston, MA (US)

( * ) Notice: Subject to any disclaimer, the term of this patent is extended or adjusted under 35 U.S.C. 154(b) by 223 days.

(21) Appl. No.: 13/776,907

(22) Filed: Feb. 26, 2013

(65) Prior Publication Data

US 2013/0231423 A1    Sep. 5, 2013

Related U.S. Application Data

(60) Provisional application No. 61/606,282, filed on Mar. 2, 2012.

(51) Int. Cl.
| | |
|---|---|
| *C08K 5/3472* | (2006.01) |
| *C08K 5/36* | (2006.01) |
| *C09C 1/48* | (2006.01) |
| *C09C 1/50* | (2006.01) |
| *C09C 1/52* | (2006.01) |
| *C09C 1/54* | (2006.01) |
| *C09C 1/56* | (2006.01) |

(52) U.S. Cl.
CPC ............... *C08K 5/3472* (2013.01); *C08K 5/36* (2013.01); *C09C 1/48* (2013.01); *C09C 1/50* (2013.01); *C09C 1/52* (2013.01); *C09C 1/54* (2013.01); *C09C 1/56* (2013.01); *C01P 2002/87* (2013.01); *C01P 2006/12* (2013.01); *Y02T 10/862* (2013.01)

(58) Field of Classification Search
CPC .......................................................... C08J 3/22
USPC ................. 524/105, 236; 106/473; 548/263.8
See application file for complete search history.

(56) References Cited

U.S. PATENT DOCUMENTS

| | | |
|---|---|---|
| 2,833,736 A | 5/1958 | Glaser |
| 3,048,559 A | 8/1962 | Heller et al. |
| 3,607,813 A | 9/1971 | Purcell et al. |
| 3,947,436 A | 3/1976 | Rocktäschel et al. |
| 4,029,633 A | 6/1977 | Hagopian et al. |
| 4,104,833 A | 8/1978 | Glowacki |
| 4,234,705 A | 11/1980 | Matoba |
| 4,271,213 A | 6/1981 | Grimm et al. |
| 4,308,061 A | 12/1981 | Iwahashi et al. |
| 4,692,481 A | 9/1987 | Kelly |
| 4,770,706 A | 9/1988 | Pietsch |
| 4,995,197 A | 2/1991 | Shieh et al. |
| 5,026,755 A | 6/1991 | Kveglis et al. |
| 5,051,464 A | 9/1991 | Johnson et al. |
| 5,116,886 A | 5/1992 | Wolff et al. |
| 5,159,009 A | 10/1992 | Wolff et al. |
| 5,190,739 A | 3/1993 | MacKay et al. |
| 5,204,404 A | 4/1993 | Werner, Jr. et al. |
| 5,243,047 A | 9/1993 | Lawson |
| 5,266,361 A | 11/1993 | Schwarte et al. |
| 5,266,406 A | 11/1993 | Den Hartog et al. |
| 5,270,364 A | 12/1993 | Schwartz et al. |
| 5,275,900 A | 1/1994 | Ong et al. |
| 5,278,018 A | 1/1994 | Young et al. |
| 5,314,945 A | 5/1994 | Nickle et al. |
| 5,319,044 A | 6/1994 | Jung et al. |
| 5,356,973 A | 10/1994 | Taljan et al. |
| 5,484,574 A | 1/1996 | Macaluso et al. |
| 5,484,575 A | 1/1996 | Steenackers |
| 5,510,221 A | 4/1996 | Matalevich et al. |
| 5,554,739 A | 9/1996 | Belmont |
| 5,559,163 A | 9/1996 | Dawson et al. |
| 5,559,169 A | 9/1996 | Belmont et al. |
| 5,571,654 A | 11/1996 | Ong |
| 5,707,432 A | 1/1998 | Adams et al. |
| 5,753,742 A | 5/1998 | Bumanlag |
| 5,763,388 A | 6/1998 | Lightsey et al. |
| 5,830,930 A | 11/1998 | Mahmud et al. |
| 5,837,045 A | 11/1998 | Johnson et al. |
| 5,851,280 A * | 12/1998 | Belmont et al. ............ 106/472 |
| 5,859,120 A | 1/1999 | Karl et al. |
| 5,869,550 A | 2/1999 | Mahmud et al. |
| 5,877,238 A | 3/1999 | Mahmud et al. |
| 5,885,335 A | 3/1999 | Adams et al. |
| 5,895,522 A | 4/1999 | Belmont et al. |
| 5,900,029 A | 5/1999 | Belmont et al. |

(Continued)

FOREIGN PATENT DOCUMENTS

| | | |
|---|---|---|
| CA | 2351162 A1 | 12/2001 |
| EP | 0 720 066 B1 | 3/1999 |

(Continued)

OTHER PUBLICATIONS

International Search Report and Written Opinion, dated May 31, 2013, issued in connection with corresponding International Application No. PCT/US2013/028269 (11 pages).
SciFinder Abstract, Caponero et al., "Emissions of batch combustion of waste tire chips: the pyrolysis effect," Combustion Science and Technology, 2005, 177(2), 347-381, CAN 142:434784; AN 2005:153381, CAPLUS (copyright 2006).
SciFinder Abstract, Kim et al., "Radial tire tread rubber for truck and bus excellent in heat resistance using low toxicity softening agent," Replub. Korean Kongkae Taeho Kongbo, 2002, CAN 142:178366; AN 2004:929784, CAPLUS (copyright 2006).
SciFinder Abstract, Kim et al., "Tire rubber composition having reduced polycyclic aromatic hydrocarbon content," Replub. Korean Kongkae Taeho Kongbo, 2001, CAN 142:75918; AN 2004:869526, CAPLUS (copyright 2006).
SciFinder Abstract, Mise, "Carbon black for electrophotographic toner," Nippon Gazo Gakkaishi, 2004, 43(5), 334-336, CAN 142:465103; AN 2004:863547, CAPLUS (copyright 2006).

(Continued)

*Primary Examiner* — Hannah Pak

(57) ABSTRACT

Modified carbon blacks, such as rubber blacks, having a low PAH concentration are described. Furthermore, elastomeric or rubber compositions containing the modified carbon black of the present invention are further described, as well as methods of making modified carbon black having a low PAH concentration.

27 Claims, 2 Drawing Sheets

(56) References Cited

U.S. PATENT DOCUMENTS

| | | | |
|---|---|---|---|
| 5,922,118 | A | 7/1999 | Johnson et al. |
| 6,014,998 | A | 1/2000 | Mowdood et al. |
| 6,024,135 | A | 2/2000 | Nobileau |
| 6,028,137 | A | 2/2000 | Mahmud et al. |
| 6,042,643 | A | 3/2000 | Belmont et al. |
| 6,048,923 | A | 4/2000 | Mabry et al. |
| 6,086,841 | A | 7/2000 | Lee |
| 6,156,837 | A | 12/2000 | Branan et al. |
| 6,197,274 | B1 | 3/2001 | Mahmud et al. |
| 6,251,983 | B1 | 6/2001 | Vogler et al. |
| 6,273,142 | B1 | 8/2001 | Braad |
| 6,290,767 | B1 | 9/2001 | Bergemann et al. |
| 6,323,273 | B1 | 11/2001 | Mahmud et al. |
| 6,348,181 | B1 | 2/2002 | Morgan |
| 6,398,858 | B1 | 6/2002 | Yu et al. |
| 6,403,713 | B2 | 6/2002 | Onizawa |
| 6,471,763 | B1 | 10/2002 | Karl |
| 6,476,154 | B1 | 11/2002 | Maly et al. |
| 6,485,693 | B1 | 11/2002 | Morgan |
| 6,489,389 | B1 | 12/2002 | Ohta et al. |
| 6,494,946 | B1 | 12/2002 | Belmont et al. |
| 6,506,849 | B1 | 1/2003 | Hojo et al. |
| 6,518,350 | B1 | 2/2003 | Kobayashi et al. |
| 6,521,691 | B1 | 2/2003 | Agostini et al. |
| 6,559,209 | B1 | 5/2003 | Araki et al. |
| 6,573,324 | B1 | 6/2003 | Cohen et al. |
| 6,646,028 | B2 | 11/2003 | Ramos et al. |
| 6,660,075 | B2 | 12/2003 | Bergemann et al. |
| 6,723,783 | B2 | 4/2004 | Palumbo et al. |
| 6,740,151 | B2 | 5/2004 | Belmont et al. |
| 6,758,891 | B2 | 7/2004 | Bergemann et al. |
| 6,767,945 | B2 | 7/2004 | Hahn et al. |
| 6,780,389 | B2 | 8/2004 | Karl et al. |
| 6,780,915 | B2 | 8/2004 | Yagi et al. |
| 6,815,473 | B2 | 11/2004 | Robert et al. |
| 6,831,194 | B2 | 12/2004 | Srinivas |
| 6,837,288 | B2 | 1/2005 | McElrath et al. |
| 6,841,606 | B2 | 1/2005 | Yanagisawa |
| 6,852,790 | B2 | 2/2005 | Thielen et al. |
| 6,878,768 | B2 | 4/2005 | Tardivat et al. |
| 6,908,960 | B2 | 6/2005 | Takaya et al. |
| 6,908,961 | B2 | 6/2005 | Wang et al. |
| 6,926,877 | B2 | 8/2005 | Green |
| 6,929,783 | B2 | 8/2005 | Chung et al. |
| 6,960,250 | B2 | 11/2005 | Luethge et al. |
| 6,984,689 | B2 | 1/2006 | Penot et al. |
| 7,019,063 | B2 | 3/2006 | Wada et al. |
| 7,084,228 | B2 | 8/2006 | Labauze et al. |
| 7,101,922 | B2 | 9/2006 | Chen et al. |
| 7,105,595 | B2 | 9/2006 | Mabry et al. |
| 7,175,946 | B2 | 2/2007 | Step et al. |
| 7,217,405 | B2 | 5/2007 | Karl |
| 7,294,185 | B2 | 11/2007 | Belmont et al. |
| 7,300,964 | B2 | 11/2007 | Niedermeier et al. |
| 7,836,928 | B2 | 11/2010 | Hogan et al. |
| 7,902,278 | B2 | 3/2011 | Hogan et al. |
| 7,928,159 | B2 | 4/2011 | Yan |
| 8,034,316 | B2 | 10/2011 | Yurovskaya et al. |
| 8,124,682 | B2 | 2/2012 | Froehlich et al. |
| 8,420,044 | B2 | 4/2013 | Bergemann et al. |
| 2001/0036994 | A1 | 11/2001 | Bergemann et al. |
| 2002/0011185 | A1 | 1/2002 | Belmont |
| 2002/0020318 | A1 | 2/2002 | Galloway et al. |
| 2003/0101901 | A1 | 6/2003 | Bergemann et al. |
| 2003/0129529 | A1 | 7/2003 | Step et al. |
| 2003/0176562 | A1* | 9/2003 | Rafailovich et al. ........... 524/495 |
| 2004/0179871 | A1* | 9/2004 | Fukuda .......................... 399/302 |
| 2005/0014884 | A1 | 1/2005 | Bhatt et al. |
| 2005/0034629 | A1 | 2/2005 | Belmont et al. |
| 2005/0063892 | A1 | 3/2005 | Tandon et al. |
| 2005/0063893 | A1 | 3/2005 | Ayala et al. |
| 2005/0085568 | A1 | 4/2005 | Nishitani |
| 2006/0084751 | A1 | 4/2006 | Step et al. |
| 2006/0094829 | A1 | 5/2006 | Chino et al. |
| 2008/0159947 | A1 | 7/2008 | Yurovskaya et al. |
| 2010/0108213 | A1* | 5/2010 | Miyazaki ................... 152/209.5 |
| 2011/0076608 | A1* | 3/2011 | Bergemann et al. ....... 430/108.9 |
| 2011/0077343 | A1 | 3/2011 | Ishikawa et al. |
| 2011/0253008 | A1 | 10/2011 | Sekiyama |
| 2013/0165560 | A1* | 6/2013 | Belmont et al. .............. 524/105 |

FOREIGN PATENT DOCUMENTS

| | | |
|---|---|---|
| EP | 0964028 A1 | 12/1999 |
| EP | 1394221 A1 | 3/2004 |
| EP | 1136526 B1 | 1/2008 |
| WO | WO 94/019412 | 9/1994 |
| WO | 9923174 | 5/1999 |
| WO | WO 00/32701 | 6/2000 |
| WO | 2004063289 A2 | 7/2004 |
| WO | 2007039416 A1 | 4/2007 |
| WO | 2010006889 A2 | 1/2010 |
| WO | 2011028337 A2 | 3/2011 |
| WO | 2012031183 A2 | 3/2012 |

OTHER PUBLICATIONS

SciFinder Abstract, Mastral et al., "Three-Ring PAH Removal from Waste Hot Gas by Sorbents: Influence of the Sorbent Characteristics," Environmental Science and Technology, 2002, 36(8), 1821-1826, CAN 136:358795; AN 2002:164432, CAPLUS (copyright 2006).

SciFinder Abstract, Mastral et al., "Effects of CO2 on the Phenanthrene Adsorption Capacity of Carbonaceous Materials," Energy and Fuels, 2002, 16(2), 510-516, CAN 136:251576; AN 2002:64508, CAPLUS (copyright 2006).

SciFinder Abstract, Hirasa et al., "Anticlogging water-thinned carbon black-containing inks," Jpn. Kokai Tokkyo Koro, 2001, 6 pp., CAN 136:55375; AN 2001:927400, CAPLUS (copyright 2006).

SciFinder Abstract, Harmon et al., "Thermally enhanced vapor extraction for removing PAHs from lampblack-contaminated soil," Journal of Environmental Engineering, 2001, 127(11) 986-993, CAN 136:139168; AN 2001:800071, CAPLUS (copyright 2006).

SciFinder Abstract, Rivin et al., "Sorption of bioactive materials on carbon," Carbon, 1987, 25(1), 135-45, CAN 106:126573; AN 1987:126573, CAPLUS (copyright 2006).

SciFinder Abstract, Bevan et al., "Elution of polycyclic aromatic hydrocarbons from carbon blacks into biomembranes in vitro," Toxicology and Industrial Health, 1985, 1(1), 57-67, CAN 104:163502; AN 1986:163502, CAPLUS (copyright 2006).

SciFinder Abstract, Golitsyn et al., "Carbon black for electrically conducting compositions," U.S.S.R., 1984, CAN 102:115928; AN 1985:115928, CAPLUS (copyright 2006).

SciFinder Abstract, Alsberg et al., "Evaluation of extraction methods for carbon black; POM analysis and mutagenicity assay," Polynucl. Aromat. Hydrocarbons: Phys. Biol. Chem., Int. Symp., $6^{th}$ (1982), Meeting date: 1981, 73-82; CAN 99:48722; AN 1983:448722, CAPLUS (copyright 2006).

SciFinder Abstract, Glebko et al., "Vulcanizable unsaturated rubber stock," U.S.S.R., 1982, CAN 96:219105; AN 1982:219105, CAPLUS (copyright 2006).

SciFinder Abstract, Glebko et al., "Vulcanizable unsaturated rubber stock," U.S.S.R., 1982, CAN 96:219104; AN 1982:219104, CAPLUS (copyright 2006).

SciFinder Abstract, Meilakhs et al., "Vulcanizable polymeric composition based on stereoregular rubber," U.S.S.R., 1981, CAN 96:124321; AN 1982:124321, CAPLUS (copyright 2006).

SciFinder Abstract, Stenberg et al., "Vaccum sublimation and solvent extraction of polycyclic aromatic compounds adsorbed on carbonaceous materials," Analytical Chemistry, 1981, 53(13), 2067-72; CAN 95:161442; AN 1981:561442, CAPLUS (copyright 2006).

SciFinder Abstract, Cavana et al., "Aromatic polycyclic hydrocarbon content in some types of carbon black used as fillers in autovehicle tires," Journal of Commodity Science, 1980, 19(3), 223-30; CAN 94:193470; AN 1981:193470, CAPLUS (copyright 2006).

(56) References Cited

OTHER PUBLICATIONS

SciFinder Abstract, Taylor et al., "Solvent extracts of carbon black—determination of total extractables and analysis for benzo[a]pyrene," American Industrial Hygiene Association Journal, 1958-1999 (1980), 41(11), 819-25, CAN 94:108327; AN 1981:108327, CAPLUS (copyright 2006).

SciFinder Abstract, Lamond et al., "Reducing the polycyclic aromatic hydrocarbon content of carbon black," U.S., 1979, 4 pp., CAN 90:139709; AN 1979:139709, CAPLUS (copyright 2006).

Office Action received in corresponding Japanese Patent Application No. 2014-560033 dated Aug. 25, 2015 (6 pages).

* cited by examiner

| Name | CAS number | MW | Structure-picture |
|---|---|---|---|
| 1 Benzo(a)anthracene | 56-55-3 | 228.29 |  |
| 2 Benzo(a)pyrene | 50-32-8 | 252.31 |  |
| 3 Benzo(e)pyrene | 192-97-2 | 252.31 |  |
| 4 Benzo(b)fluoranthrene | 205-99-2 | 252.31 |  |
| 5 Benzo(j)fluoranthrene | 205-82-3 | 252.31 |  |
| 6 Benzo(k)fluoranthrene | 207-08-9 | 252.31 |  |
| 7 Chrysene | 218-01-9 | 228.29 |  |
| 8 Dibenzo(a,h)anthracene | 53-70-3 | 278.35 |  |
| 9 Naphthalene | 91-20-3 | 128.17 |  |
| 10 Acenaphthylene | 208-96-8 | 152.19 |  |
| 11 Acenaphthene | 83-32-9 | 154.21 |  |
| 12 Fluorene | 86-73-7 | 166.22 |  |
| 13 Phenanthrene | 85-01-8 | 178.23 |  |
| 14 Anthracene | 120-12-7 | 178.23 |  |
| 15 Fluoranthene | 206-44-0 | 202.35 |  |
| 16 Pyrene | 129-00-0 | 202.35 |  |
| 17 Benzo(g,h,i)perylene | 191-24-2 | 276.33 |  |
| 18 Indeno(1,2,3-cd)pyrene | 193-39-5 | 276.33 |  |
| 19 Cyclopenta(c,d)pyrene | 27208-37-3 | 226.27 |  |
| 20 Benzo(g,h,i)fluoranthene | 203-12-3 | 226 |  |
| 21 Perylene | 198-55-0 | 252.31 |  |
| 22 Anthanthrene | 191-26-4 | 276.33 |  |
| 23 Coronene | 191-07-1 | 300.35 |  |

Figure 1

MODIFIED CARBON BLACKS HAVING LOW PAH AMOUNTS AND ELASTOMERS CONTAINING THE SAME

BACKGROUND OF THE INVENTION

This application claims the benefit under 35 U.S.C. §119(e) of prior U.S. Provisional Patent Application No. 61/606,282, filed Mar. 2, 2012, which is incorporated in its entirety by reference herein.

The present invention relates to modified carbon blacks, compositions containing the modified carbon blacks, such as elastomeric or rubber compositions, methods of making the modified carbon blacks, as well as methods of using the modified carbon blacks.

Industrially manufactured carbon black is produced by pyrolysis of hydrocarbons at high temperatures under controlled process conditions. Under these conditions, trace levels of polyaromatic hydrocarbons, also known as PAHs, form on the carbon black surface.

Some PAHs have the potential to cause adverse health effects. Although the PAHs that are adhered to the carbon black are not readily available for human exposure, actions are being taken by both EU regulators and customers to reduce the concentration of PAHs in carbon black (See Borm P J, et. al., *Formation of PAH-DNA adducts after in vivo and vitro exposure of rats and lung cells to different commercial carbon blacks*, Toxicology and Applied Pharmacology, 2005 Jun. 1; 205(2): 157-167). Recent examples include:

Promulgation of EU directive 2007/19/EC which harmonizes the rules for the plastic materials and articles intended to come in contact with food. The directive establishes a Benzo(a)pyrene content of 0.25 mg/kg in carbon black. Previous to this directive, no PAH limit existed for carbon black.

Promulgation of EU directive 2005/69/EC which regulates the content of PAHs in extenders oils used for the production of tires. This directive does not directly regulate the content of PAHs in carbon black; however, the EU has chosen to restrict the content of PAHs in extender oils and blends used to produce tires, in order to reduce the total annual emissions of PAHs, as required in the 1998 Protocol to the 1979 Convention on Long Range Transboundary Air Pollution on Persistent Organic Pollutants.

The above listed examples demonstrate the growing trend towards lower PAH carbon blacks.

Previous processes have made carbon black with lower PAHs. For instance, U.S. Pat. No. 8,034,316 describes low PAH concentrations in carbon blacks. As described in the patent, the carbon black can be separated from a gas phase in a carbon black manufacturing process at a temperature of from 260° C. to about 950° C., such that the PAH in gas form can be removed, and this temperature is low enough that it does not anneal or degrade the surface of the carbon black and degrade reinforcement performance of the low PAH carbon black. In another description in this patent, the carbon black can be formed during the manufacturing of carbon black, wherein the method includes removing hot tail gas that contains PAH generally at temperatures of from 260° C. to about 950° C. Other methods are further described in this patent, wherein the objective of the patent is not to anneal the surface of the carbon black or otherwise affect surface activity and capacity for reinforcement of elastomeric composites. While the processes described in this patent are effective in forming carbon blacks having low PAHs, the processes require changes in fundamental manufacturing steps and, in some cases, equipment and plant configuration used to create the carbon black particles. Thus the methods described in this patent cannot be carried out within existing manufacturing equipment and/or operating conditions for making particles of carbon black on an industrial scale. It is not possible to alternate between these methods and ordinary methods in the same carbon black plant and it would be necessary to dedicate a line to low PAH carbon black processes. As a result, engineering and operational complexities and costs can be excessive.

While there is a growing desire to have lower PAHs for carbon blacks, any reduction in PAH cannot compromise the desirable performance properties of carbon black in rubber and other applications. Thus, it is desirable to reduce PAH concentration in modified carbon blacks without sacrificing the reinforcement properties achievable by the current carbon blacks and utilizing current manufacturing plants.

SUMMARY OF THE PRESENT INVENTION

A feature of the present invention is to provide modified carbon blacks having low PAH amounts.

A further feature of the present invention is to provide modified carbon blacks having low PAH amounts which have acceptable physical properties in rubber and/or other applications.

A further feature of the present invention is to provide methods of making modified carbon blacks having low PAH amounts.

An additional feature of the present invention is to provide modified rubber blacks having desirable rubber properties, and yet having low PAH amounts.

A further feature of the present invention is to provide processes to make carbon blacks having low PAHs which can be done in large production amounts and/or is less time-consuming and/or less costly than previous methods, and which can be carried out with existing manufacturing equipment and/or operating conditions on an industrial scale.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a modified carbon black having a low PAH amount, such as a low total concentration for a defined group of 22 PAH compounds (see FIG. 1). For purposes of the present invention, the PAH22 is a measurement of the PAHs identified in FIG. 1 except for Benzo(j)fluoranthrene. Also, the PAH8 for purposes of the present invention is a measurement of Benzo(a)anthracene, Benzo(a)pyrene, Benzo(e)pyrene, Benzo(b)fluoranthrene, Benzo(j)fluoranthrene, Benzo(k)fluoranthrene, Chrysene, and Dibenzo(a,h)anthracene. BaP is a reference to Benzo(a)pyrene. For instance, the modified carbon black can have a low total concentration for the 22 PAHs on the order of 75 ppm or less, 50 ppm or less, such as 45 ppm or less, 40 ppm or less, or 35 ppm or less, or 30 ppm or less, 25 ppm or less, 20 ppm or less, 15 ppm or less, 10 ppm or less, 8 ppm or less, 5 ppm or less, 1 ppm or less, such as 1 ppm to 50 ppm, 1 ppm to 40 ppm, 1 ppm to 30 ppm, 1 ppm to 20 ppm, 1 ppm to 10 ppm, 2 ppm to 10 ppm, 0.001 ppm to 75 ppm, or 0.01 ppm to 75 ppm.

The present invention further relates to elastomeric or rubber compositions containing at least one modified carbon black of the present invention in the elastomeric or rubber composition along with at least one elastomer or polymer or rubber.

The present invention also relates to a method of making modified carbon blacks having a low PAH total concentration.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 1 is a table of 22 PAH compounds (except for Benzo (j)fluoranthrene) which are considered the "PAH 22" for purposes of the present invention.

DETAILED DESCRIPTION OF THE PRESENT INVENTION

Figure 2:
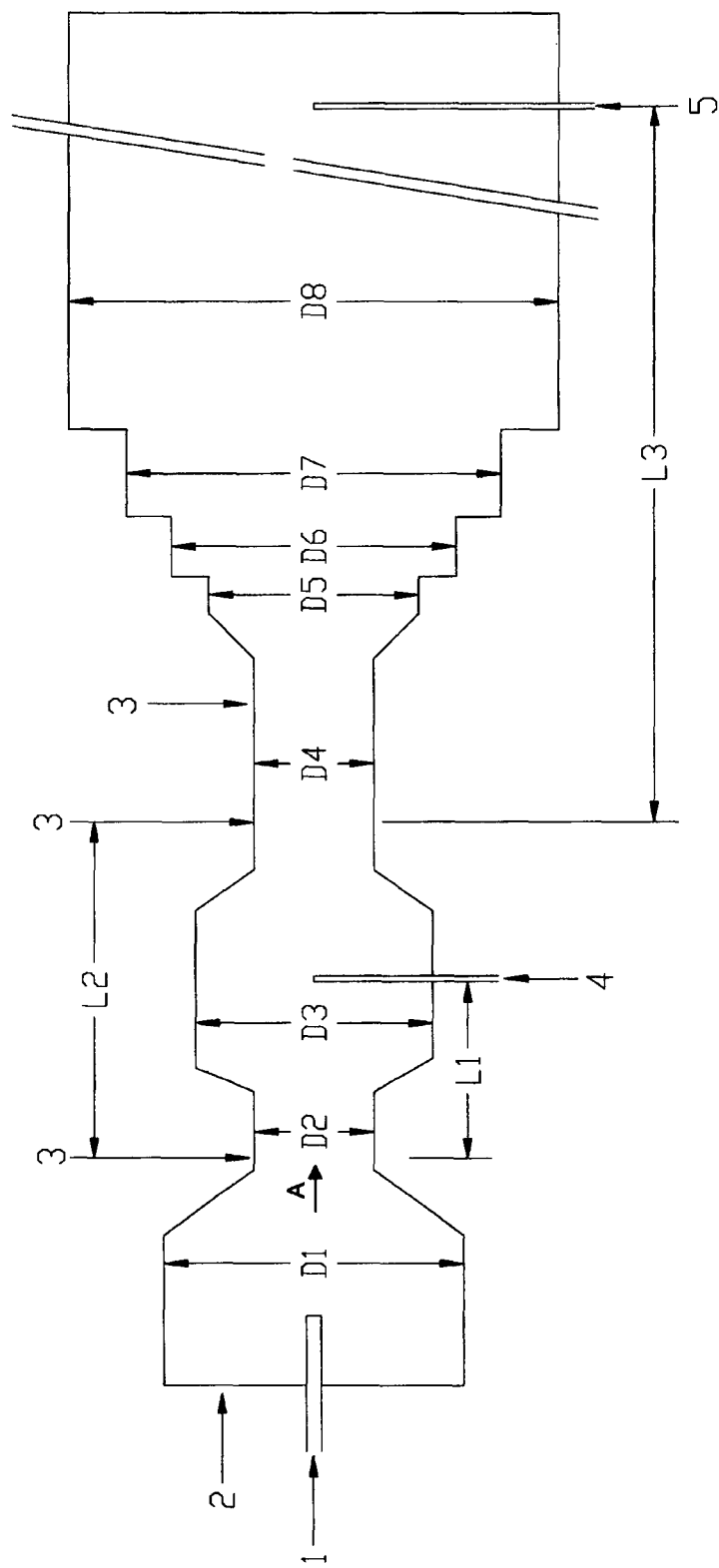
FIG. 2 illustrates a cross-section of one example of a carbon black reactor.

The present invention relates to modified carbon blacks having a low PAH amount, such as a low PAH 22. The present invention also relates to rubber compositions or elastomeric compositions containing at least one modified carbon black of the present invention, along with at least one elastomer. The present invention further relates to methods of making the modified carbon blacks of the present invention.

In order to provide a fast and cost-efficient and a large-scale process for making carbon blacks having a low PAH amount, processes were developed as described below. However, in overcoming the problem of developing a process that can produce large amounts of carbon black with a low PAH amount in a cost-efficient and timely way, it was discovered that the surface of the carbon black was affected, and as described further below, the surface was annealed. Specifically, in one or more processes of the present invention, the surface of the carbon black at least partially deactivates. Surface deactivation can be seen by a decrease in "bound rubber" percent and/or in the reinforcement performance of an elastomeric composite that contains the carbon black as seen in the physical properties (e.g., stress/strain) of the rubber compound. In addition or alternatively, a deactivation of the surface can be seen in surface energy measurements or interfacial potential property values as described in U.S. Pat. Nos. 7,776,604; 7,776,603; 7,776,602; and 7,000,457, all incorporated in their entirety by reference herein. For purposes of the present invention, a surface deactivation is generally at least a 10% negative impact on one or more of these properties that reflect surface activation, such as at least 20%, at least 30%, at least 40%, at least 50%, at least 60%, at least 70%, at least 80%, at least 90% of a decrease or negative impact on one or more of these properties, or two or more of these properties, or all of these properties that reflect activation on the surface of the carbon black. The negative impact from a surface deactivation can be from 10% to 95%, from 20% to 90% or more, from 30% to 90% or more, and the like. Analytical tests for quantifying reinforcement performance include, for example, percent bound rubber determinations (S. Wolff, M-J Wang, E-H Tan, Rubber Chem Techn, v 66, 163, 1993), dynamic rubber properties (max tan delta @ 0° C. tested with ARES/Rheometrics Dynamic Spectrometer II (RDS II, Rheometrics, Inc., N.J) operated in a torsion strain mode (shear) and performed at 0° C. for strain sweeps with double strain amplitude (DSA) ranging from 0.2 to 120%, at a constant frequency of 10 Hz), stress/strain properties, abrasion tests (abrasion resistance (21% slip) tested per U.S. Pat. No. 4,995,197), and the like.

The "negative impact" is based on comparing the same grade of carbon black, but having conventional PAH amounts commonly present on that grade of carbon black. Put another way, the comparison is based upon a conventional carbon black that has the same STSA or that has the same or very similar (±10% or ±5%) STSA to the carbon black of the present invention, except the conventional carbon black has no surface deactivation and optionally has a PAH amount that is generally over 75 ppm, or over 100 ppm and/or generally has a PAH amount that is at least 50%, or at least 75%, or at least 100% higher than the PAH content of the carbon black of the present invention, based on PAH 22 content.

Thus, the efficient processes to form carbon black with a low PAH amount create a problem with regard to surface deactivation which then affects the properties of the carbon black in an elastomer composite and/or the performance properties of the elastomer containing the carbon black. The surface deactivation would lead to an unacceptable product to the user or manufacturer incorporating the carbon black into a matrix or elastomer. Thus, this problem had to be solved or the process of making low PAH amounts in an efficient and timely manner would not be useful. As described below, this problem was addressed and solved by forming carbon black with a low PAH amount and then treating the carbon black to attach and/or adsorb one or more chemical groups onto the surface of the carbon black, which had the ability to at least partially restore one or more of the properties lost due to surface deactivation, such as the ability to restore at least partially the bound rubber percent and/or one or more reinforcement performance properties in an elastomer composite, such as restoring at least partially the stress/strain of the rubber compound and/or interfacial potential property or surface energy property. The treatment of the surface of the carbon black to at least partially restore one or more of the properties lost to surface deactivation has the ability to restore at least 10%, at least 20%, at least 30%, at least 40%, at least 50%, at least 60%, at least 70%, at least 80%, at least 90%, at least 95% (such as from 10% to 50%, or from 20% to 50%) of the amount of property loss due to surface deactivation. In other words, the present invention has the ability to restore at least partially, if not almost entirety or entirely, one or more or all of the properties lost due to surface deactivation. Put another way, the present invention has the ability to restore, at least partially or almost completely, or completely, the bound rubber percent lost due to surface deactivation and/or one or more reinforcement performance properties, such as stress/strain, and/or at least one surface energy property (or interfacial potential property). Further details are provided below.

In preferred processes to manufacture carbon blacks, such as reinforcing grades of carbon black having low PAH content or even semi-reinforcing grades of carbon black, process conditions typically create carbon black particles having an annealed surface. As a result of forming an annealed surface on the particles, the functional performance of these reinforcing grades is degraded significantly in one or more, or all, of the following characteristics as a reinforcement material in elastomeric composites:

a) Decreased surface activity
b) Decreased surface hydrogen content
c) Increased size of crystallites on the surface
d) Decreased number of surface irregularities (e.g., a planarization effect), and/or
e) Decreased number of high energy sites on the surface.

For purposes of the present invention, the term "annealed" with regards to an "annealed surface" means the above. In manufacturing processes for making furnace carbon blacks, the conditions preferred for lowering PAH content, which also anneal surfaces of carbon black particles, can include subjecting the carbon black in the reactor (once the desired surface area is developed) to high temperatures (either over conventional, shorter or longer time periods). This can be done by subjecting the reaction stream that contains the carbon black having the desired developed surface area to a delayed reaction quench which then exposes the reaction stream to high temperatures for an extended period of time and/or exposing the reaction stream to high temperatures after the surface area has developed by injecting or otherwise introducing oxidants to the reaction stream to raise the temperature or maintain a high temperature sufficient to destroy the PAHs in the reaction stream.

In processes to manufacture carbon black such as reinforcing grades of carbon black, the PAH content of the annealed carbon black can be reduced by at least 50%, by at least 60%, by at least 75%, by at least 80%, by at least 85%, by at least 90%, by at least 95%, by at least 98% compared to the same carbon black that is not annealed. In other words, this comparison for reduction can be for the same unannealed carbon black that has the same or similar (within 10% or within 5%) surface area as measured by STSA. The percent reduction is a reference to reduction in ppm amounts of the PAH22 content.

In an annealed carbon black, the PAH content has been lowered to be 75 ppm or less, 50 ppm or less, such as 45 ppm or less, 40 ppm or less, or 35 ppm or less, or 30 ppm or less, 25 ppm or less, 20 ppm or less, 15 ppm or less, 10 ppm or less, 8 ppm or less, 5 ppm or less, 1 ppm or less, such as 1 ppm to 50 ppm, 1 ppm to 40 ppm, 1 ppm to 30 ppm, 1 ppm to 20 ppm, 1 ppm to 10 ppm, 2 ppm to 10 ppm, 0.001 ppm to 75 ppm, 0.01 ppm to 75 ppm, or 0.0001 ppm to 5 ppm.

The present invention provides a method for restoring reinforcement functionality to low PAH, annealed carbon black particles by taking the further step of attaching and/or adsorbing at least one chemical group to the annealed surface. Unlike previous processes which altered the fundamental manufacture of the carbon black particle so as to lower PAH content while attempting to maintain reinforcement properties, the method of the present invention creates low PAH content carbon black particles and then at least partially restores reinforcement functionality lost by surface annealing of the particles by a post-manufacturing step whereby the carbon black particle surface is chemically modified as described herein.

The PAH content on the carbon black can be reduced by at least 50%, by at least 60%, by at least 75%, by at least 80%, by at least 85%, by at least 90%, by at least 95%, by at least 98% compared to a carbon black having the same or nearly the same STSA (within 10% or within 5%) but not having an annealed surface, and generally having a higher PAH content than the annealed carbon black. The percent reduction is a reference to reduction in ppm amounts of the PAH 22 content.

The modified carbon black of the present invention can thus be considered a low PAH carbon black having an annealed surface and having attached and/or adsorbed at least one chemical group.

The present invention relates to a modified carbon black having a low PAH amount with an attached and/or adsorbed chemical group(s). The modified carbon black can be formed so that the modified carbon black has a low PAH amount. The modified carbon black of the present invention can have a low PAH amount and have standard ASTM carbon black specifications at least with respect to STSA. As shown in the examples, the iodine number generally increases from being annealed and can increase at least 5%, at least 10%, at least 15%, at least 25%, at least 50%, such as from 5% to 75%, compared to a carbon black having the same or nearly the same STSA (within 10% or within 5%) but not having an annealed surface, The effectiveness of the present invention is especially seen and useful with reinforcing carbon blacks and semi-reinforcing carbon blacks. Thus, the modified carbon blacks can be reinforcing grades of carbon black and/or semi-reinforcing grades of carbon black. Examples of reinforcing grades are N110, N121, N220, N231, N234, N299, N326, N330, N339, N347, N351, N358, and N375. Examples of semi-reinforcing grades are N539, N550, N650, N660, N683, N762, N765, N774, N787, and/or N990.

The modified carbon black can have any STSA such as ranging from 20 $m^2/g$ to 250 $m^2/g$ or higher. However, the effectiveness of the present invention is best seen with STSA of least 70 $m^2/g$, such as from 70 $m^2/g$ to 250 $m^2/g$, or 80 $m^2/g$ to 200 $m^2/g$ or from 90 $m^2/g$ to 200 $m^2/g$, or from 100 $m^2/g$ to 180 $m^2/g$, from 110 $m^2/g$ to 150 $m^2/g$, from 120 $m^2/g$ to 150 $m^2/g$ and the like. The carbon black can be a furnace black or a carbon product containing silicon-containing species, and/or metal containing species and the like. The carbon black can be for purposes of the present invention, a multi-phase aggregate comprising at least one carbon phase and at least one metal-containing species phase or silicon-containing species phase (also known as silicon-treated carbon black). As stated, the carbon black can be a rubber black, and especially a reinforcing grade of carbon black or a semi-reinforcing grade of carbon black. Iodine number ($I_2$ No.) is determined according to ASTM Test Procedure D1510. STSA (statistical thickness surface area) is determined based on ASTM Test Procedure D-5816 (measured by nitrogen adsorption). OAN is determined based on ASTM D1765-10.

The carbon black can be an oxidized carbon black, such as pre-oxidized using an oxidizing agent. Oxidizing agents include, but are not limited to, air, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may be used, particularly mixtures of gaseous oxidants such as oxygen and ozone. In addition, carbon blacks prepared using other surface modification methods to introduce ionic or ionizable groups onto a pigment surface, such as chlorination and sulfonation, may also be used. Processes that can be employed to generate pre-oxidized carbon blacks are known in the art and several types of oxidized carbon black are commercially available.

For purposes of the present invention, the PAH content is measured/tested by the method described at 21 CFR part 17B, FDA Federal Register, v62, #90. Friday May 9, 1997, incorporated in its entirety by reference herein.

The modified carbon black optionally has the ability to impart at least one beneficial mechanical property in a rubber matrix or an elastomeric composition. The at least one beneficial mechanical property can be one or more of the following:

abrasion resistance (21% slip)—tested per U.S. Pat. No. 4,995,197.

elongation (%)—ASTM D 3191-02 Standard Test Methods for Carbon Black in SBR—Recipe and Evaluation Procedures.

tensile strength (Mpa); ASTM D 3191-02 Standard Test Methods for Carbon Black in SBR—Recipe and Evaluation Procedures.

100% modulus (Mpa); ASTM D 3191-02 Standard Test Methods for Carbon Black in SBR—Recipe and Evaluation Procedures.

300% modulus (Mpa); ASTM D 3191-02 Standard Test Methods for Carbon Black in SBR—Recipe and Evaluation Procedures.

ratio of 300% modulus/100% modulus (M300%/M100%); ASTM D 3191-02 Standard Test Methods for Carbon Black in SBR—Recipe and Evaluation Procedures.

bound rubber (%); S. Wolff, M-J Wang, E-H Tan, Rubber Chem Techn, v 66, 163 (1993).

max tan delta @ 0° C. tested with ARES/Rheometrics Dynamic Spectrometer II (RDS II, Rheometrics, Inc., N.J) operated in a torsion strain mode (shear). The measurements were performed at 0° C. for strain sweeps with double strain amplitude (DSA) ranging from 0.2 to 120%, at a constant frequency of 10 Hz.

The modified carbon black of the present invention can have a low PAH amount and at least one of these beneficial mechanical properties, at least two, at least three, at least four, at least five, at least six, at least seven, and/or all eight of these beneficial mechanical properties. These mechanical properties are measured by known ASTM or published standards, which are provided next to each mechanical property above.

The present invention further relates to a modified carbon black having a low PAH amount, such as a low PAH 22, wherein the modified carbon black has the ability to impart at least one beneficial mechanical property, as described above, wherein at least one of these mechanical properties can be within 50% (e.g., within 40%, within 30%, within 20%) of the value for the same mechanical property for the same type or grade of carbon black, having a high (or conventional) PAH, such as a high PAH 22, and also is unmodified (e.g., no attached or adsorbed chemical groups as described herein). A high PAH 22 can be, for instance, above 75 ppm, 100 ppm or higher or 600 ppm or higher, such as 600 ppm to 1,000 ppm of PAH 22. The modified carbon black of the present invention, which has a low PAH amount and the ability to impart at least one beneficial mechanical property in a polymer matrix within about 50% of the same mechanical property for the same type of modified carbon black having a high PAH, can be with respect to at least one beneficial mechanical property, at least two, at least three, at least four, at least five, at least six, at least seven, and/or all eight of these beneficial mechanical properties. In other words, the present invention has the ability to provide a modified carbon black having a low PAH amount, such as a low PAH 22, and yet impart at least comparable mechanical properties or rubber properties to a polymer matrix, such as an elastomer composition, wherein comparable is understood to mean within about 50% (e.g., within 40% or within 30%) of the particular mechanical property.

For purposes of the present invention, a low PAH amount includes or is defined by a low PAH 22. As indicated above, a PAH 22 is a measurement of PAHs as set forth in FIG. 1 of the present application. For purposes of the present invention, a low PAH amount can be defined by a low PAH 22. For instance, the modified carbon black can have a low total concentration for the 22 PAHs on the order of 75 ppm or less, 50 ppm or less, such as 45 ppm or less, 40 ppm or less, or 35 ppm or less, or 30 ppm or less, 25 ppm or less, 20 ppm or less, 15 ppm or less, 10 ppm or less, 8 ppm or less, 5 ppm or less, such as 1 ppm to 50 ppm, 1 ppm to 40 ppm, 1 ppm to 30 ppm, 1 ppm to 20 ppm, 1 ppm to 10 ppm, 2 ppm to 10 ppm. Suitable ranges include from about 1 ppm to about 45 ppm, 1 ppm to 40 ppm, 1 ppm to 35 ppm, 1 ppm to 30 ppm, 1 ppm to 20 ppm, 1 ppm to 10 ppm, or 1 ppm to 8 ppm, with respect to the total amount of PAH 22 present in the carbon black. For any of the ranges or amounts provided above, the lower limit can be 0.01 ppm, 0.001, 0.1 ppm, 1 ppm, 2 ppm, 5 ppm, 10 ppm, or 15 ppm. The ranges can be exact or approximate (e.g., "about 1 ppm" and the like). These ppm ranges can apply to all or any number of PAHs (e.g., all PAHs or one or more of the PAHs). For purposes of the present invention, the PAH 22 is a measurement of the PAHs identified in FIG. 1 except for Benzo (j)fluoranthrene. Also, the PAH 8 for purposes of the present invention is a measurement of Benzo(a)anthracene, Benzo(a)pyrene, Benzo(e)pyrene, Benzo(b)fluoranthrene, Benzo(j) fluoranthrene, Benzo(k)fluoranthrene, Chrysene, and Dibenzo(a,h)anthracene. BaP is a reference to Benzo(a)pyrene.

Optionally, in addition to the PAH22 content or separately, the PAH8 for a modified carbon black a) can be 5 ppm or less (e.g., 4 ppm or less, 0.0001 ppm to 5 ppm, 0.1 ppm to 5 ppm, 0.5 ppm to 5 ppm, 3 ppm or less). In addition or in the alternative, the BaP can be 4 ppm or less (0.001 ppm to 4 ppm, 0.1 ppm to 4 ppm, 0.5 ppm to 3 ppm). The modified carbon blacks of the present invention can have an equally lower PAH 8 and in general can have a PAH 8 that is at least 50% less (e.g., 50% to 80% lower) than the PAH 22 values described herein. Further, the BaP for the modified carbon blacks can be typically at least 75% lower (e.g., 75% to 95% lower) than the PAH 22 values described herein.

The modified carbon black, such as the modified rubber-grade or tire-grade carbon black, can have one or more of the following mechanical properties or rubber properties in combination with the STSA of from 20 $m^2/g$ to 250 $m^2/g$ or from 80 to about 150 $m^2/g$, wherein the mechanical properties and/or rubber properties are determined when the modified carbon black in present in a rubber formulation according to ASTM D 3191-02 Standard Test Methods for Carbon Black in SBR—Recipe and Evaluation Procedures:

abrasion resistance (21% slip) of from 80 to 170;
elongation (%) of from 300 to 600;
tensile strength (Mpa) of from 20 to 35;
100% modulus (Mpa) of from 2.4 to 4.5;
300% modulus (Mpa) of from 12 to 23;
ratio of 300% modulus/100% modulus (M300%/M100%) of from 3.5 to 6;
bound rubber (%) of from 15 to 30; and/or
max tan delta @ 0° C. of from 0.25 to 0.4.

These properties can be achieved for one or more rubber compounds, and can be achieved when the rubber is natural rubber and/or SBR.

The present invention also relates to a modified carbon black having a low PAH amount as described above, as well as a STSA of from 20 $m^2/g$ to 250 $m^2/g$ or from 80 to 140 $m^2/g$ and having one or more of the following mechanical properties based on the formula provided for each property, wherein x is the STSA ($m^2/g$) of the carbon black and y is the mechanical property.

abrasion resistance(21% slip):$y=5/6(x)+(43+/-10)$.

The other mechanical properties identified above can have the same or similar relationships with the STSA.

With regard to the chemical groups that can be attached and/or adsorbed onto the carbon black, such as to restore at least partially the effects of surface deactivation, the following chemical groups can be attached and/or adsorbed onto the carbon black.

The modified carbon black can be a carbon black having adsorbed thereon at least one triazole. More specific formulas and examples are provided.

The modified carbon black can in addition or alternatively have attached at least one chemical group, such as an organic group, for instance, an organic group comprising at least one alkyl group and/or aromatic group. The alkyl group and/or aromatic group can be directly attached to the carbon black. The chemical group can be the same or similar or different to the group that is adsorbed onto the carbon black. The chemical group attached can be or include at least one triazole, or at least one pyrazole, or at least one imidazole, or any combinations thereof.

In more detail, the present invention relates, in part, to a modified carbon black that is or includes a carbon black having adsorbed thereon at least one triazole, such as 1,2,4 triazole. The modified carbon black preferably improves abrasion resistance when present in an elastomeric composition compared to the same carbon black that is not modified (i.e., compared to the same carbon black having the same or very similar low PAH content but not having any attached and/or adsorbed chemical groups).

The modified carbon black can be a carbon black having adsorbed thereon:

a) at least one triazole, such as at least one 1,2,4 triazole, having a sulfur-containing or poly-sulfur containing substituent, in the presence of or absence of any other aromatic group; or b) at least one pyrazole having a sulfur-containing substituent in the presence of or absence of any other aromatic group, or any combinations thereof. Again, preferably, the modified carbon black improves abrasion resistance when present in an elastomeric composition compared to the carbon black that is not modified.

For purposes of the present invention, adsorbing means that the adsorbed chemical group is not chemically attached onto the surface of the carbon black and can be removed from the surface by a solvent extraction, such as a Soxhlet extraction. For example, a chemical group that is adsorbed onto the carbon black can be removed by Soxhlet extraction that can occur for 16-18 hours in methanol or ethanol, wherein the extraction removes all, or nearly or substantially all, of the chemical group. The extraction can be repeated one or more times. It is possible that a residual of the adsorbed group can remain on the surface of the carbon black. For purposes of the present invention, the extraction by solvent, as described herein, can remove at least 80 wt % of the adsorbed chemical group and, generally, at least 90% or at least 95% by weight of the adsorbed chemical group. This determination can be made by an elemental analysis of extracted and unextracted samples.

For purposes of the present invention, the triazole includes a chemical group that has a triazole-containing group. The triazole can be a 1,2,4 triazole or a 1,2,3 triazole. The triazole can be a thiol or polysulfide-containing polytriazole. 1,2,4 triazole or 1,2,4 triazole-containing groups are preferred as adsorbed chemical groups. Examples of the triazole include a triazole having the formula (or tautomers thereof):

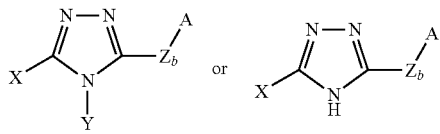

or a triazole (or tautomers thereof) having the formula:

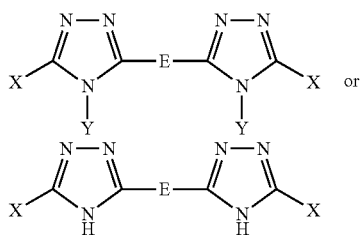

wherein $Z_b$ is an alkylene group (e.g., $C_1$-$C_4$ alkylene), wherein b is 0 or 1;

X, which is the same or different, is H, $NH_2$, SH, $NHNH_2$, CHO, COOR, COOH, $CONR_2$, CN, $CH_3$, OH, NDD', or $CF_3$;

Y is H, or $NH_2$;

A is a functional group and can be or comprise $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional groups;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8; and

Q is $(CH_2)_w$, $(CH2)_x$ $O(CH_2)_z$, $(CH_2)_x$ $NR(CH_2)_z$, or $(CH_2)_x$ $S(CH_2)_z$, where x is 1 to 6, z is 1 to 6, and w is 2 to 6. $S_kR$ can be $S_kH$. For $S_kR$, when R is not H, k is 2 to 8, and when R is H, k is 1 to 8;

E is a polysulfur-containing group, such as $S_w$ (where w is 2 to 8), SSO, $SSO_2$, $SOSO_2$, $SO_2SO_2$; and the triazole can optionally be N— substituted with an NDD' substituent, where D and D', which are the same or different, are H or $C_1$-$C_4$ alkyl.

More specific examples of the triazole include, but are not limited to, 3-amino-1,2,4-triazole-5-thiol, 3-amino-1,2,4-triazole-5-yl-disulfide; 1,2,4-triazole-3-thiol; 1,2,4-triazole-3-yl-disulfide; 3-amino-1,2,4-triazole-5-yl-trisulfide; 4-amino-3-hydrazino-1,2,4-triazole-5-thiol, and the like.

For purposes of the present invention, the pyrazole includes a chemical that has a pyrazole-containing group. The pyrazole can be a thiol or polysulfide-containing polypyrazole. Examples of the pyrazole can include a pyrazole having the formula (or tautomers thereof):

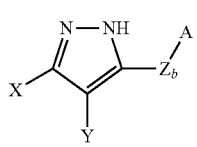

or a pyrazole having the formula (or tautomers thereof):

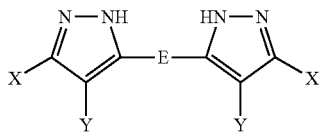

wherein $Z_b$ is an alkylene group (e.g., $C_1$-$C_4$ alkylene group), wherein b is 0 or 1;

X and Y are independently H, $NH_2$, SH, $NHNH_2$, CHO, COOR, COOH, $CONR_2$, CN, $CH_3$, OH, NDD', or $CF_3$, or Y can be R, where each X and Y are the same or different;

A is a functional group and can be or comprise $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene; k is an integer from 1 to 8; and Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6. $S_kR$ can be $S_kH$. For $S_kR$, when R is not H, k is 2 to 8, and when R is H, k is 1 to 8. E is a polysulfur-containing group, such as $S_w$ (where w is 2 to 8), SSO, $SSO_2$, $SOSO_2$, or $SO_2SO_2$, and D and D', which are the same or different, are H or $C_1$-$C_4$ alkyl.

More specific examples of the pyrazole include, but are not limited to, pyrazole-3-thiol, pyrazol-3-yl disulfide, and/or 3-methyl-pyrazole-5-thiol.

For any of the formulas set forth herein, with regard to the substituent A, more specific examples include, but are not limited to, SH; SSAr, where Ar is a triazole or a pyrazole, or SSAr where Ar is a different heterocycle.

As stated, the chemical groups adsorbed onto the carbon black or surface of the carbon black to create this type of the modified carbon black can be a single chemical group, or two or more different types of chemical groups. One or more different types of triazoles can be present and/or one or more different types of pyrazoles can be present, or any combinations, such as one or more triazoles, with one or more pyrazoles, and the like. In addition, as an option, other chemical groups, other than the triazole and/or pyrazole, can also additionally be present on the carbon black as an adsorbed chemical group.

The adsorbed chemical group can be entirely or substantially entirely on the exposed surface of the carbon black to form the modified carbon black or can be a lesser amount. For instance, the adsorbed chemical group can cover at least 5% of the surface area of the carbon black surface, at least 10%, at least 20%, at least 30%, at least 40%, at least 50%, at least 60%, at least 70%, at least 80%, at least 90%, at least 95%, at least 97%, at least 99%, or about 100%, or 100% of the surface area on the surface of the carbon black.

The amount of adsorbed chemical group(s) can be any amount on the carbon black. For example, the total amount of the adsorbed chemical group can be from about 0.01 to about 10 micromoles of heterocyclic groups/$m^2$ surface area of carbon black, as measured by nitrogen adsorption (BET method), including from about 1 to about 8 micromoles/$m^2$, from about 2 to about 6 micromoles/$m^2$, or from about 3 to about 5 micromoles/$m^2$.

With regard to the process to form the modified carbon black having an adsorbed chemical group(s), any conventional adsorption technique can be used. For instance, the chemical group that is desired to be on the carbon black or on the surface of the carbon black to form this version of the modified carbon black can be dissolved in a suitable solvent and applied to the surface of the carbon black, wherein the solvent can then be removed, such as by evaporation techniques. As an alternative, the chemical to be adsorbed onto the surface of the carbon black to form the modified carbon black can be melted. Any manner to contact the carbon black with the chemical to be adsorbed onto the surface of the carbon black can be used, such as spray coating techniques, and the like. The chemical solution to be adsorbed on the carbon black can be mixed together in a pin pelletizer and the solvent can then be evaporated.

As an option, the modified carbon black having the adsorbed chemical group, as mentioned herein, can optionally (or alternatively) include the attachment of one or more chemical groups.

For purposes of the present invention, the attachment of one or more chemical groups means that the chemical group is not adsorbed onto the surface of the carbon black and cannot be removed or substantially removed by the extraction process described earlier for purposes of removing an adsorbed chemical. The attachment of at least one chemical group generally is by a chemical attachment, such as by a covalent bond.

The chemical group that is attached and/or adsorbed on the carbon black can be at least one organic group. The organic group can include or be an alkyl group and/or an aromatic group. More specific examples include a $C_{1-20}$ alkyl group or a $C_{6-18}$ aromatic group, such as a $C_1$-$C_{12}$ alkyl group or $C_6$-$C_{12}$ aromatic group(s). Examples of attached groups can include an alkyl or aromatic group that has one or more functional groups that can be the same as substituent A described herein. The alkyl group and/or aromatic group can be directly attached to the carbon black.

Aromatic sulfides encompass another group of chemical groups that can be attached and/or adsorbed onto the carbon black to form the modified carbon black of the present invention. These aromatic sulfides can be represented by the formulas $Ar(CH_2)_q S_k (CH_2)_r Ar'$ or $A-(CH_2)_q S_K (CH_2)_r Ar''$ wherein Ar and Ar' are independently substituted or unsubstituted arylene or heteroarylene groups, Ar'' is an aryl or heteroaryl group, k is 1 to 8 and q and r are 0-4. Substituted aryl groups would include substituted alkylaryl groups. Arylene groups include phenylene groups, particularly p-phenylene groups, or benzothiazolylene groups. Aryl groups include phenyl, naphthyl and benzothiazolyl. The number of sulfurs present, defined by k preferably ranges from 2 to 4. Aromatic sulfide groups are bis-para-$(C_6H_4)$—$S_2$—$(C_6H_4)$— and para-$(C_6H_4)$—$S_2$—$(C_6H_5)$. The diazonium salts of these aromatic sulfide groups may be conveniently prepared from their corresponding primary amines, $H_2N$—Ar—$S_k$—Ar'—$NH_2$ or $H_2N$—Ar—$S_k$—Ar''. The chemical group can be organic groups having an aminophenyl, such as $(C_6H_4)$—$NH_2$, $(C_6H_4)$—$CH_2$—$(C_6H_4)$—$NH_2$, $(C_6H_4)$—$SO_2$—$(C_6H_4)$—$NH_2$.

The modified carbon black can be a carbon black having an attached and/or adsorbed chemical group that is $Ar(CH_2)_q S_k (CH_2)_r Ar'$, wherein Ar and Ar' are the same or different and are arylene or heteroarylene; k is an integer from 1 to 8; q is an integer from 0 to 4; and r is an integer from 0 to 4. The Ar and Ar' can be an arylene; k can be an integer from 1 to 8; and q and r can be 0. The Ar and Ar' can be phenylene; k can be an integer from 2 to 4; and q and r can be 0. In this formula, k can be 2. In this formula, Ar and Ar' can be a heteroarylene; k can be an integer from 1 to 8; and q and r can be 0. In this formula, Ar and Ar' can be benzothiazolylene; k can be an integer from 2 to 4; and q and r can be 0. In this formula, k can be 2.

The modified carbon black can be a carbon black having an attached and/or adsorbed chemical group that is $Ar(CH_2)_qS_k(CH_2)_rAr'$, wherein Ar and Ar' is an arylene or a heteroarylene; Ar' is an aryl or a heteroaryl; k is an integer from 1 to 8; q is an integer from 0 to 4; and r is an integer from 0 to 4. In this formula, Ar can be an arylene; Ar' can be an aryl; k can be an integer from 1 to 8; and q and r can be 0. In this formula, Ar can be phenylene; Ar' can be phenyl; k can be an integer from 2 to 4; and q and r can be 0. In this formula, Ar can be phenylene; Ar' can be a heteroaryl; k can be an integer from 1 to 8; and q and r can be 0. In this formula, Ar can be phenylene; Ar' can be benzothiazolyl; k can be an integer from 2 to 4; and q and r can be 0.

The modified carbon black can be a carbon black having an attached and/or adsorbed chemical group that is $-(C_6H_4)-S_k-(C_6H_4)-NH_2$ wherein k is an integer from 2 to 8, and/or a chemical group that is $-(C_6H_4)-S_k-(C_6H_4)-NH_2$ and k is 2.

A method to attach one or more chemical groups onto the carbon black to form this type of modified carbon black can include any known attachment mechanism for attaching chemical groups to carbon black particles, including diazonium reactions.

The modified carbon black having attached chemical groups can be prepared using and adapting the methods described in U.S. Pat. Nos. 5,554,739; 5,707,432; 5,837,045; 5,851,280; 5,885,335; 5,895,522; 5,900,029; 5,922,118; 6,042,643; 6,398,858; 7,175,946; 6,471,763; 6,780,389; 7,217,405; 5,859,120; and 6,290,767; U.S. Patent Application Publication Nos. 2003-0129529 A1; 2002-0020318; 2002-0011185 A1; and 2006-0084751 A1, and PCT Publication No. WO 99/23174, which are incorporated in their entireties herein by reference. These references describe, in part, the use of diazonium chemistry to attach functional groups to pigments. As just an example, these processes have been adapted and used to form the modified carbon blacks of the present invention (having attached chemical groups).

An amino version of a triazole, pyrazole, and/or imidazole can be used, and then using the diazonium reaction, for instance, described in the above patents, can be attached onto the carbon black to form this version of the modified carbon black having an attached chemical group, such as an organic group, and such as an attached at least one triazole group, pyrazole group, and/or imidazole group. The attached triazole, pyrazole, and/or imidazole group are further exemplified below for another version of a modified carbon black, and would be applicable here as well.

The modified carbon black (with attached chemical groups) may be prepared using any method known to those skilled in the art for attaching chemical groups. For example, the modified carbon blacks can be prepared using the methods described in the above cited patents/publications. Other methods for preparing the modified carbon blacks include reacting a carbon black having available functional groups with a reagent comprising the organic group, such as is described in, for example, U.S. Pat. No. 6,723,783, which is incorporated in its entirety by reference herein. Such functional carbon blacks may be prepared using the methods described in the references incorporated above. In addition modified carbon blacks containing attached functional groups may also be the following and/or prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, and PCT Publication No. WO 2011/028337, each of which is also incorporated in their entirety by reference herein.

The amount of attached groups can be varied, depending on the desired use of the modified carbon black and the type of attached group. For example, the total amount of organic group attached may be from about 0.01 to about 6.0 micromoles of groups/$m^2$ surface area of carbon black, as measured by nitrogen adsorption (BET method), including from about 0.1 to about 5.0 micromoles/$m^2$, from about 0.2 to about 3.0 micromoles/$m^2$, or from about 0.3 to about 2.0 micromoles/$m^2$.

Examples of the triazole, pyrazole, and/or imidazole groups are the same as for the adsorbed chemical groups described above, except these groups are attached, for instance, by way of a chemical bond to the carbon black. Examples of the attached chemical groups are set forth below and in PCT Publication No. WO 2011/028337, incorporated in its entirety by reference herein.

For purposes of the present invention, the triazole includes a chemical group that has a triazole-containing group. The triazole can be a 1,2,4 triazole or a 1,2,3 triazole. The triazole can be a thiol or polysulfide-containing polytriazole. 1,2,4 triazole or 1,2,4 triazole-containing groups are preferred as adsorbed and/or attached triazole chemical groups in view of achieved properties, especially in elastomeric composites. With regard to the attached triazole, examples include, but are not limited to, the following:

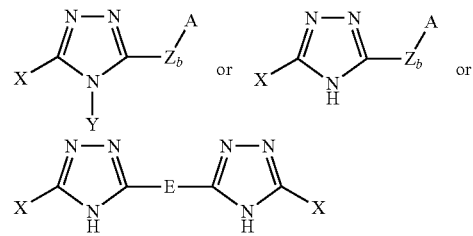

or tautomers thereof, wherein the substituents are the same as stated earlier, except X (or one of the X's) is or includes a bond to the carbon black to become attached.

In the triazole formulas, $Z_b$ is an alkylene group (e.g., a $C_1$-$C_4$ alkylene), where b is 0 or 1;

at least one X comprises a bond to the carbon black, and any remaining X comprises a bond to the carbon black or a functional group, such as the various substituents A and/or R described herein;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6;

E is a polysulfur-containing radical; and the triazole can be optionally N— substituted with an NDD' substituent, where D and D', which are the same or different, are H or $C_1$-$C_4$ alkyl; and Y is H, alkyl, aryl, or $NH_2$.

In specific examples, the group attached to the carbon black can be or include a mercapto-triazolyl group, e.g. a 5-mercapto-1,2,4-triazole-3-yl group, and/or a triazole disulfide group, and/or a 1,2,4-triazol-3-yl group. The group attached to the carbon black can be or include a 2-mercapto-1,3,4-thiadiazol-5-yl group and/or a thiadiazole disulfide group. Substituted or unsubstituted oxadiazole groups as well as other substituted or unsubstituted azole, e.g., diazole, groups, can be attached, e.g., directly, to the carbon black.

For purposes of the present invention, the attached pyrazole is or includes a chemical that has a pyrazole-containing group. The pyrazole can be a thiol or polysulfide-containing polypyrazole. With regard to the pyrazole, examples include, but are not limited to, the following:

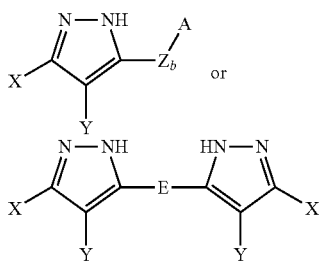

or tautomers thereof, wherein the substituents are the same as stated earlier, except X (or one of the X's) is or includes a bond to the carbon black to become attached.

In the pyrazole formulas, $Z_b$ is an alkylene group (e.g., a $C_1$-$C_4$ alkylene), where b is 0 or 1;

at least one X or Y comprises a bond to the carbon black and any other X or Y, which is the same or different, comprises a bond or a functional group, such as the various substituents A and/or R described herein;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x O(CH_2)_z$, $NR(CH_2)_z$, or $(CH_2)_x S(CH_2)_z$, where x is 1 to 6, z is 1 to 6, and w is 2 to 6; and E is a polysulfur-containing group.

For purposes of the present invention, the attached imidazole is or includes a chemical that has an imidazole-containing group. The imidazole can be a thiol or polysulfide-containing polyimidazole. With regard to the imidazole, examples include, but are not limited to, the following:

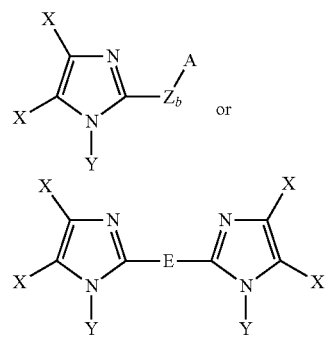

or tautomers thereof, wherein the substituents are the same as stated earlier, except X (or one of the X's) is or includes a bond to the carbon black to become attached.

In the imidazole formulas, $Z_b$ is an alkylene group (e.g., a $C_1$-$C_4$ alkylene), where b is 0 or 1;

each X comprises a bond to the carbon black, H, alkyl (examples provided elsewhere apply here), aryl (examples provided elsewhere apply here), or $NH_2$, with the proviso that at least one X comprises a bond;

Y is H or $NH_2$;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R, which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6; and E is a polysulfur-containing group.

The attached organic group can be or comprise an alkyl group or aromatic group having at least functional group that is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N═NR, $NR_3^+$ $X^-$, $PR_3^+X^-$, $S_kR$, $SSO_3H$, a $SSO_3^-$ salt, $SO_2NRR'$, $SO_2SR$, $SNRR'$, $SNQ$, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_x O(CH_2)_z$, $(CH_2)_x NR(CH_2)_z$, or $(CH_2)_x S(CH_2)_z$, where w is an integer from 2 to 6 and x and z are independently integers from 1 to 6.

The attached organic group can be or comprise an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are independently integers from 1 to 6, and y is an integer from 1 to the total number of —CH radicals in the aromatic radical.

Ar can be or comprise a triazole group, Ar can be or comprise a pyrazole group, or Ar can be or comprise an imidazole group.

The attached organic group can be or comprise at least one aminomethylphenyl group and/or carboxyphenyl.

The attached organic group can be or comprise X—$C_6H_4$—S—S—$C_6H_4$—X, where at least one X is a bond to the carbon black and the other X is a bond to the carbon black or a functional group, such as the substituent A described herein.

The attached organic group can be or comprise at least one aromatic sulfide or polysulfide.

As an option, one or more additional but different chemical groups can be attached onto the carbon black, such as one or more additional chemical groups that are different from an attached triazole, attached pyrazole, and/or attached imidazole. The attached chemical group can be any of the attached chemical groups described earlier and/or in the above-mentioned patents, such as an attached alkyl group and/or attached aromatic group, for instance, amino methyl phenyl, carboxy phenyl, or phenyl disulfide phenyl ($C_6H_5$—S—S—$C_6H_4$).

For purposes of the present invention, a further version of the modified carbon blacks of the present invention is where the modified carbon black comprises a carbon black having attached at least one triazole, such as at least 1,2,4 triazole, such as at least 1,2,4 triazole having a sulfur-containing substituent, for instance, in the presence or absence of any other aromatic group. The modified carbon black having the attached chemical group, such as the at least one triazole, can improve hysteresis when present in an elastomer composition compared to the same carbon black that is not modified. Again, the elastomeric formulations set forth in the Examples can be used to confirm this test property. A further modified carbon black of the present invention is or comprises a carbon black having attached thereon a triazole comprising:

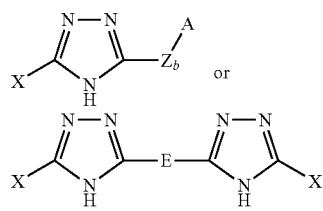

or tautomers thereof, wherein
wherein $Z_b$ is an alkylene group (e.g., a $C_1$-$C_4$ alkylene), where b is 0 or 1;

at least one X comprises a bond to the carbon black and any remaining X comprises a bond to the carbon black or a functional group, such as the various substituents A or R described herein;

A is a functional group that is $S_kR$, $SSO_3H$, $SO_2NRR$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of the functional group(s);

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6;

E is a polysulfur-containing radical; and the triazole can be optionally N— substituted with an NDD' substituent, where D and D', which are the same or different, are H or $C_1$-$C_4$ alkyl.

This version of the modified carbon black can be with or without any adsorbed chemical groups.

Throughout the present application, with respect to the attached chemical groups onto the carbon black, the chemical group is attached through at least one bond from the chemical group to the carbon black. In the present application, the substituent X can represent or comprise a bond. It is to be understood for purposes of the present invention that the substituent X can include a bond, as well as other substituents or elements, for instance, for purposes of achieving the bond to the carbon black. For example, X can be or consist of a bond. In the alternative, X can comprise a bond. For instance, X can be a bond that includes a linker group. The linker group can be a silane linker group or derived from a silane coupling agent. The linker group can be or include a Si-containing group, a Ti-containing group, a Cr-containing group, and/or Zr-containing group, or other suitable linker groups that promote the attachment of a chemical group onto a carbon black, such as a metal oxide carbon black, for instance, silica. Examples of such linkers which can be adopted for purposes of the present invention, include those set forth in U.S. Pat. Nos. 3,947,436; 5,159,009; and 5,116,886, all incorporated in their entirety by reference herein.

In the present invention, for the various versions (adsorbed and/or attached groups) of the modified carbon black of the present invention, the preparation of the modified carbon black (that is the attachment and/or adsorbing of one or more chemical groups) can occur and should occur prior to the carbon black being introduced with other ingredients, such as the ingredients to form an elastomeric composition, such as at least one elastomer. Put another way, the chemical group(s) used in the present invention are pre-adsorbed and/or pre-attached to the carbon black(s) prior to mixing or compounding or otherwise contacting at least one elastomer or at least one polymer and/or other components of a formulation. The present inventors have discovered that various improvements in properties achieved by the present application, namely hysteresis and/or abrasion resistance can be diminished or not achieved at all when the modification of the carbon black is attempted in the presence of other ingredients (e.g., in situ), such as trying to compound with at least one elastomer and/or at least one polymer.

For purposes of the present invention, any combination of modified carbon blacks of the present invention can be used.

For instance, as described herein, various versions of the modified carbon black have been described. For instance, one version of the modified carbon black of the present invention is a carbon black having adsorbed groups and, optionally, with attached chemical groups. Another version of the present invention involves a carbon black having attached chemical groups without any adsorbed groups. Thus, as one option, a formulation, such as an elastomeric formulation, can comprise a combination of various modified carbon blacks of the present invention, for instance, some modified carbon black having one or more adsorbed chemical groups can be used in combination with one or more other modified carbon blacks having attached chemical groups. Thus, any combination of the modified carbon blacks in formulations, such as elastomeric or polymeric formulations, can be used.

For purposes of the present invention, when the modified carbon black has an adsorbed chemical group and an attached chemical group, the placement of the adsorbed chemical group onto the carbon black can occur before, during, and/or after attachment of the chemical group, or in any sequence when more than one adsorbed and/or more than one attached group is present on the carbon black.

The present invention further relates to elastomeric compositions or elastomeric composites, also considered rubber compositions or composites. The elastomeric composition contains at least one elastomer and at least one modified carbon black of the present invention and, optionally, one or more conventional components used in elastomer formulations. More than one type of modified carbon black can be used.

Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, solution SBR, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, 1-butene and 1-pentene. As noted further below, the rubber compositions can contain, in addition to the elastomer and carbon black and coupling agent, various processing aids, oil extenders, antidegradents, and/or other additives.

One or more elastomers can be a functionalized elastomer. For instance, the elastomer can be an SBR that is functionalized with a chemical group. For instance, the functionalized group can be carboxylic acid, hydroxyl, triazole, aminosilane(s), epoxy, tin-coupled, and the like. The modified carbon blacks of the present invention has the ability to improve one or more hysteresis properties.

As an option, a continuously-fed latex and a carbon black, such as a carbon black slurry, can be introduced and agitated in a coagulation tank. This is also known as a "wet mix" technique. The latex and carbon black slurry can be mixed and coagulated in the coagulation tank into small beads, referred to as "wet crumb." The various processes and techniques described in U.S. Pat. Nos. 4,029,633; 3,048,559; 6,048,923; 6,929,783; 6,908,961; 4,271,213; 5,753,742; and 6,521,691 can be used for this combination of carbon black with elastomer and coagulation of the latex. Each of these patents are incorporated in their entirety by reference herein. This type of elastomeric formulation can be used with the modified carbon blacks of the present invention using the various techniques, formulations, and other parameters described in these patents and processes, except that the modified carbon blacks of the present invention are used.

Exemplary natural rubber latices include, but are not limited to, field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

Elastomer composites can be prepared with a carbon black loading of at least about 40 phr, at least about 50 phr, at least about 55 phr, at least about 60 phr, at least about 65 phr, or at least about 70 phr of carbon black, for example, from about 40 to about 70 phr, from about 50 to about 75 phr, from about 55 to about 80 phr, from 60 to about 85 phr, from 65 to about 90 phr, from 70 to about 90 phr, from about 40 to about 60 phr, between 50 and about 65 phr, from 55 to about 80 phr, from about 60 to about 90 phr, from about 65 to about 80 phr, or from about 70 to about 80 phr.

One or more coupling agents can be used in the present invention. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, NXT silane coupling agent (a thiocarboxylate functional silane: 3-Octanoylthio-1-propyltriethoxysilane) from Momentive Performance Materials, Wilton, Conn., and/or coupling agents that are chemically similar or that have the one or more of the same chemical groups. Additional specific examples of coupling agents, by commercial names, include, but are not limited to, VP Si 363 from Evonik Industries. The coupling agent can be present in any amount in the elastomer composite. For instance, the coupling agent can be present in the elastomer composite in an amount of at least 0.2 parts per hundred parts of carbon black, such as silica (by mass), from about 0.2 to 60 parts per hundred of carbon black, such as silica, from about 1 to 30 parts per hundred of carbon black, such as silica, from about 2 to 15 parts per hundred of carbon black, such as silica, or from about 5 to 10 parts per hundred of carbon black, such as silica.

One or more antioxidants can be used in any of the processes of the present invention. The antioxidant (an example of a degradation inhibitor) can be an amine type antioxidant, phenol type antioxidant, imidazole type antioxidant, metal salt of carbamate, para-phenylene diamine(s) and/or dihydrotrimethylquinoline(s), polymerized quinine antioxidant, and/or wax and/or other antioxidants used in elastomer formulations. Specific examples include, but are not limited to, N-(1,3-dimethylbutyl)-N'-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline, Agerite Resin D, available from R. T. Vanderbilt, butylhydroxytoluene (BHT), and butylhydroxyanisole (BHA), and the like. Other representative antioxidants may be, for example, diphenyl-p-phenylenediamine and others such as, for example, those disclosed in The Vanderbilt Rubber Handbook (1978), pages 344-346, which is incorporated in its entirety by reference herein. An antioxidant and an antiozonate are collectively degradation inhibitors. These degradation inhibitors illustratively include a chemical functionality, such as an amine, a phenol, an imidazole, a wax, a metal salt of an imidazole, and combinations thereof. Specific degradation inhibitors operative herein illustratively include N-isopropyl-N'-phenyl-p-phenylenediamine, N-(1-methylheptyl)-N'-phenyl-p-phenylenediamine, 6-ethoxy-2,2,4-trimethyl-1,2-dihydroquinoline, N,N'-diphenyl-p-phenylenediamine, octylated diphenylamine, 4,4'-bis(a,a'-dimethylbenzyl)diphenylamine, 4,4'-dicumyl-diphenylamine, 2,5-di-tert-butyl-hydroquinone, 2,2'-methylene-bis(4-methyl-6-tert-butylphenol), 2,2'-methylenebis(4-methyl-6-methylcyclohexlphenol), 4,4'-thio-bis(3-methyl-6-tert-butylphenol), 4,4'-butylidene-bis(3-methyl-6-tert-butylphenol), tris(nonylated phenyl)phosphite, tris-(2,4-di-t-butylphenyl)phosphite, 2-mercaptobenzimidazole, and zinc 2-mercaptobenzimidazole. An example includes at least one amine and one imidazole. Optionally, a polymerized quinoline can be used. The relative amounts of antioxidants can include 0.5 to 3 parts amine, 0.5 to 2.5 parts imidazole, and 0.5 to 1.5 parts of optional polymerized quinoline. The degradation inhibiting amine can be 4,4'-bis(alpha-dimethylbenzyl)diphenylamine, the imidazole can be zinc 2-mercaptotoluimidazole and the polymerized quinoline can be polymerized 1,2-dihydro-2,2,4-trimethylquinoline. In general, the degradation inhibitors (e.g., the antioxidant(s)) are typically present from 0.1 to 20 parts by weight per 100 parts by weight of polymer or rubber system (phr). Typical amounts of antioxidants may comprise, for example, from about 1 to about 5 phr.

The rubber composition can be for tire or tire parts and can utilize a hydrophilic carbon black. The hydrophilic carbon black can have an organic group attached to the carbon black and the organic group is or includes a substituted or unsubstituted azole group. The group can be a triazole, e.g., a mercapto-triazole and/or a triazole disulfide. The group can be a thiadiazole, e.g., a thiol-substituted thiadiazole.

The modified carbon black can be combined with conventional tire compound ingredients and additives, such as rubbers, processing aids, accelerators, cross-linking and curing materials, antioxidants, antiozonants, carbon blacks, resins, etc. to make tire compounds. Processing aids include, but are not limited to, plasticizers, tackifiers, extenders, chemical conditioners, homogenizing agents, and peptizers such as mercaptans, synthetic oil, petroleum and vegetable oils, resins, rosins, and the like. Accelerators include amines, guanidines, thioureas, thiurams, sulfenamides, thiocarbamates, xanthates, benzothiazoles and the like. Cross-linking and curing agents include peroxides, sulfur, sulfur donors, accelerators, zinc oxide, and fatty acids. Carbon blacks include clay, bentonite, titanium dioxide, talc, calcium sulfate, silica, silicates and mixtures thereof.

Any conventional mixing procedure can be used to combine the modified carbon black of the present invention with other components of an elastomer composite. Typical procedures used for rubber compounding are described in Maurice Morton, RUBBER TECHNOLOGY $3^{rd}$ Edition, Van Norstrand Reinhold Company, New York 1987, and $2^{nd}$ Edition, Van Nordstrand Reinhold Company, New York 1973. The mixture of components including modified carbon black product of the present invention and an elastomer is preferably thermomechanically mixed together at a temperature between 120° C. and 180° C.

For example, elastomeric composites of the present invention can be obtained by suitable techniques that employ, for instance, mixing in a single step or in multiple steps in an internal mixer, such as a Banbury, Intermesh mixers, extruder, on a mill or by utilizing other suitable equipment, to produce a homogenized blend. Specific implementations use techniques such as those described in U.S. Pat. No. 5,559,169, published Sep. 24, 1996 which is incorporated herein by reference in its entirety.

Curing can be conducted by techniques known in the art. For example, the modified carbon blacks of the present invention can be used in rubber compositions which are sulfur-cured, peroxide-cured and so forth.

The compositions (e.g., elastomeric or other compositions or formulations) of the present invention can contain, as an option, carbon blacks having a high PAH or can contain any conventional carbon blacks (or any other fillers or reinforcing agents), along with the carbon blacks of the present invention. Preferably, the amounts of the higher PAH carbon blacks or conventional carbon blacks is zero to minor amounts, such as 30% by weight or less of the total carbon black present (e.g., 0 wt % to 30 wt %, or 0.01 wt % to 10 wt %, or 0.01 wt % to 1 wt %).

Conventional techniques that are well known to those skilled in the art can be used to prepare the elastomeric compositions and to incorporate the modified carbon black. The mixing of the rubber or elastomer compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. Wet masterbatch methods for producing filled elastomeric compositions, such as those disclosed in U.S. Pat.

Nos. 5,763,388, 6,048,923, 6,841,606, 6,646,028, 6,929,783, 7,101,922, and 7,105,595 may also be employed to produce elastomeric compositions containing carbon blacks according to various embodiments of the invention, and these patents are incorporated in their entirety by reference herein.

With respect to the elastomeric compositions or rubber matrices of the present invention, the elastomeric composition contains at least one modified carbon black of the present invention and at least one elastomer. The elastomeric composition can have one or more of the previously-identified mechanical properties in any of the embodiments identified above. Various articles of manufacture, including tires and industrial products, may contain at least one component comprised of an elastomeric composition of this invention. For example, the elastomeric composition of this invention may be used in forming a composite with reinforcing material such as in the manufacture of tires, belts or hoses. Preferably, the composition of the present invention is in the form of a tire and more specially as a component of a tire, including, for example, one or more of the tire's tread, wirecoat, beadcoat, sidewall, apex, chafer and plycoat.

The modified carbon blacks of the present invention can be made a variety of ways. With the present invention, the modified carbon blacks having a low PAH amount can be made using the same carbon black reactor as used with conventional carbon blacks. Furthermore, the carbon blacks are made generally in the same manner as commercially-available rubber-grade blacks or tire-grade blacks, which include N234 carbon blacks. However, in the method of the present invention, the residence time and/or temperature is adjusted so as to result in the substantial destruction of the PAH species in a reaction stream that also contains the carbon black (and generally at least partial surface deactivation of the carbon black) and then quenching the reaction stream that contains the carbon black. Thus, the process used to make the following carbon blacks: N100 series, N200 series, N300 series, N400 series, N500 series, N600 series, and/or N700 series of carbon black, N110 to N990 ASTM carbon blacks (e.g., N110, N121, N220, N231, N234, N299, N326, N330, N339, N347, N351, N358, N375, N539, N550, N650, N660, N683, N762, N765, N774, and/or N990), N220 to N375 ASTM carbon black can be adopted here, but with extending residence time before quench and/or raising the temperature in the reactor. The present invention is especially useful with reinforcing grades of carbon blacks.

The reaction stream can be subjected to high temperatures in the reactor after formation of the surface area of the carbon black or after forming (e.g., post-reactor). The heat treatment, though less preferred, can be done to a pre-formed carbon black that has already exited a reactor. The heat treatment can be at a temperature of from 1200° C. to 1800° C., such as 1300° C. to 1700° C., 1300° C. to 1600° C., and the like to sufficiently destroy and/or prevent PAH from the surface of the carbon black. The heat treatment can be for a time such that the PAH levels are 75 ppm or less, 50 ppm or less, 40 ppm or less, 30 ppm or less, 20 ppm or less, 10 ppm or less, 5 ppm or less, and wherein the surface is deactivated as explained earlier. The time period for this heat treatment can be from 30 minutes to 4 hours or more. Optionally, and preferably, the surface of the carbon black afterwards is not graphitized. This subjecting to high temperatures can occur in the reactor after surface area has developed in the carbon black.

The processes used to make, for instance, Vulcan® 7H Carbon Black and Vulcan® J Carbon Blacks from Cabot Corporation, or other commercial grades of carbon blacks can be modified based on the temperatures mentioned above and/or by extending the residence time before the reaction quench and/or raising the temperature in the reactor before the reaction quench to destroy or substantially destroy the PAH species. In this modified process, the residence time of the reaction stream that contains the carbon black prior to the reaction quench can be from about 10 to about 400 milliseconds (ms), such as 20 ms to 300 ms, 30 ms to 300 ms, 50 ms to 300 ms, 70 ms to 300 ms, 80 ms to 300 ms, 100 ms to 400 ms and the like. The residence time can be from about 10 to about 400 milliseconds at a temperature of from about 1,200° C. to about 1,800° C. (for instance, 1,200° C. to 1,700° C.).

Thus, the present invention relates to a method to produce the modified carbon black, wherein the method includes introducing into a reactor at least one carbon black yielding feedstock in one or more introduction points and combining this feedstock with a stream of hot gases to form carbon black and PAH species in a reaction stream. The reaction stream travels downstream from the one or more introduction points for a residence time and at a temperature sufficient to substantially destroy the PAH and then quenching the reaction stream (e.g., a reaction quench) containing the carbon black. In carbon black manufacturing processes that are conventional today, especially rubber-grade carbon black manufacturing processes, the residence time and/or temperature is not sufficient to destroy substantially all of the PAH species in the reaction stream. However, as stated above, if the residence time is extended and/or the temperature is raised to destroy the PAH, this will generally result in at least partially surface deactivating the carbon black, which will detrimentally affect one or more properties of the carbon black and the elastomer containing the carbon black, such as the bound rubber percent, and/or other performance properties, such as stress/strain and/or one or more surface energy (or interfacial potential) properties. In the process of the present invention, the process that destroys the PAH from the carbon black reaction stream will result in at least partially surface deactivating the carbon black as stated above.

Generally, in a conventional process that makes conventional carbon blacks (e.g., rubber-grade blacks), the PAH amounts can be present on the carbon black and be significant. In the present invention, one example of increasing the residence time in order to substantially destroy the PAH in the reaction stream would be, for instance, an increase in residence time of at least 25% from the conventional time commonly used to make that particular grade of carbon black (±10% or ±5% of the STSA). For instance, the residence time (from a conventional process) can be increased from 25% to 400% or more, for instance, 45% to 400% or more, 50% to 400% or more, 75% to 400% or more, 100% to 400% or more, 125% to 400% or more, and the like. This increase in residence time can generally lead to a residence time increase of an additional 10 milliseconds to 300 milliseconds compared to the same carbon black manufacturing process for a particular grade of carbon black or compared to a carbon black having the same (within 10% or within 5%) STSA. As an example, residence time can thus be from 30 milliseconds to 400 milliseconds, which generally results in a delayed quench (e.g., delayed reaction quench) and, thus, the reaction stream containing the carbon black spends more time (residence time) in the reactor under high temperature, which prevents condensation of the PAH on the carbon black and/or results in the PAH being burned away or destroyed.

The carbon black yielding feedstock can be any conventional carbon black yielding feedstock which results in the formation of carbon black. For instance, any hydrocarbon material can be used. A suitable feedstock can be any carbon black-yielding hydrocarbon feedstock which is readily volatilizable under the conditions of the reaction. For example, unsaturated hydrocarbons such as acetylene; olefins such as ethylene, propylene, butylene; aromatics such as benzene, toluene and xylene; certain saturated hydrocarbons; and other hydrocarbons such as kerosenes, naphthalenes, terpenes, ethylene tars, aromatic cycle stocks and the like may be used.

With respect to the stream of hot gases that is combined with the carbon black yielding feedstock, the stream of hot gases can also be considered hot combustion gases that can be generated by contacting a solid, liquid, and/or gaseous fuel with a suitable oxidant stream such as, but not limited to, air, oxygen, mixtures of air and oxygen, or the like. Alternatively, a preheated oxidant stream may be passed through without adding a liquid or gaseous fuel. Examples of the fuel suitable for use in contacting the oxidant stream to generate the hot gases include any of the readily combustible gas, vapor, or liquid streams, such as natural gas, hydrogen, carbon monoxide, methane, acetylene, alcohol, or kerosene. Generally, it is preferred to use fuels having a high content of carbon-containing components and in particular, hydrocarbons. The ratio of air to fuel utilized to produce the carbon blacks of the present invention may be from about 1:1 (stiochiometric ratio) to infinity. As stated, to facilitate the generation of hot gases, the oxidant stream may be preheated.

The present invention can be practiced using any suitable carbon black producing reactor. FIG. 2, for example, illustrates a cross-section of one example of such a reactor. Reactors of this type generally use a combustion gas which is mixed with an oxidant such as air. The gas mixture is generally introduced into a combustion chamber and ignited by any suitable method. Gas flow is left to right (direction A) in FIG. 2. Once ignited, the hot gas mixture can be moved through the reactor, and brought into contact with a hydrocarbon feedstock suitable for producing carbon black. In FIG. 2, and simply as an example, fuel can be introduced at location 1 and oxidant can be introduced at location 2. Other locations are possible. The first location 3 (one or more) is an example of a point of introduction of the carbon black yielding feedstock. The second and third location 3 are examples of optional points of introduction of the additional carbon black yielding feedstock or oxidants to increase the temperature in the reactor. Location 4 is an example of additional, optional, oxidants. Location 5 is an example of a suitable location for reaction quenching. The double parallel lines signify that the reactor can be any length. The various D numbers represent various dimensions (or lengths) of the reactor. D1 through D8 can be any suitable diameter and can be the same or different. For instance, D2 can be less than D1 and D8, and D1 and D8 can be the same or different. Zone L1 or zone L2 are examples of the first temperature zone, and zone L3 is an example of the second temperature zone. Other reactor designs and/or geometries can be used. For instance, D1 and/or D2 and/or D3 can have the same or more similar sizes. D5 and/or D6 and/or D7 can have the same or more similar sizes.

Generally, carbon black-yielding feedstock can be injected into a reactor by a plurality of streams 3 (in L-2), shown in FIG. 2, which penetrate into the interior regions of the hot combustion gas stream, to insure a high rate of mixing and shearing of the hot combustion gases and the carbon black-yielding feedstock.

The carbon black yielding feedstock introduced can be introduced in any conventional way such as a single stream or plurality of streams and the introduction of the feedstocks can occur at any rate. With a plurality of streams, the rates for each stream can be the same or different.

After the reaction mixture containing the carbon black is quenched (i.e., reaction quenched), the cooled gases pass downstream into any conventional cooling and separating means whereby the carbon black is recovered. The separation of the carbon black from the gas stream is readily accomplished by conventional means such as a precipitator, cyclone separator or bag filter. For instance, a quenching fluid can be injected which may be water or other suitable fluids to stop the chemical reaction. After the carbon black is recovered, it can be treated (modified) by attaching and/or adsorbing at least one chemical group onto the carbon black as described herein.

The PAH levels of a selected carbon black of the present invention can be reduced, on a ppm weight basis, from 10% to 50%, from 20% to 50%, or 30% to 100% or more based on ppm levels, when compared to the selected carbon black having the same STSA (±10% or ±5%) and where no deactivation of the surface of the carbon black is occurring and otherwise using the same reactor conditions (except has higher temperatures and/or extended temperatures) and feedstock.

The manufacturing of the carbon black in this process can occur in a conventional furnace carbon black reactor using a conventional process, such as described in U.S. Pat. Nos. 6,926,877; 6,485,693; 6,273,142; 6,024,135; 6,348,181; 6,156,837; 6,086,841; and 5,190,739, with the differences or changes noted herein.

The modified carbon black of this invention may be used in the same applications as conventional carbon blacks. More than one type of modified carbon black of the present invention can be used in any formulation, composition, or application.

The modified carbon blacks of the present invention, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed state. Tires with lower hysteresis values reduce rolling resistance and therefore are able to reduce the fuel consumption of the vehicle utilizing the tire. Thus, it is particularly desirable to have carbon black capable of imparting greater abrasion resistance and lower hysteresis in tires.

The present invention includes the following aspects/embodiments/features in any order and/or in any combination:

1. A modified carbon black having an STSA of from about 70 $m^2/g$ to about 250 $m^2/g$, and having an annealed surface, and wherein said modified carbon black is a furnace carbon black having attached and/or adsorbed at least one chemical group.

2. The modified carbon black of any preceding or following embodiment/feature/aspect, wherein said furnace carbon black is a reinforcing grade of carbon black.

3. The modified carbon black of any preceding or following embodiment/feature/aspect, wherein said modified carbon black has a PAH 22 content of 75 ppm or less.

4. The modified carbon black of any preceding or following embodiment/feature/aspect, wherein said modified carbon black has a PAH 22 content of 50 ppm or less.

5. The modified carbon black of any preceding or following embodiment/feature/aspect, wherein said modified carbon black has a PAH 22 content of 20 ppm or less.

6. The modified carbon black of any preceding or following embodiment/feature/aspect, wherein said modified carbon black has a PAH 22 content of 10 ppm or less.

7. The modified carbon black of any preceding or following embodiment/feature/aspect, wherein said modified carbon black has a PAH 22 content of 5 ppm or less.

8. The modified carbon black of any preceding or following embodiment/feature/aspect, wherein said modified carbon black has a PAH 22 content of 1 ppm or less.

9. The modified carbon black of any preceding or following embodiment/feature/aspect, wherein said modified carbon black has a PAH 22 content of from 0.001 ppm to 5 ppm.

10. A modified carbon black having a PAH content of 75 ppm or less, wherein the PAH content is determined based on a PAH 22 content, said carbon black is a furnace carbon black, wherein said modified carbon black comprises a carbon black having attached and/or adsorbed thereon at least one chemical group.

11. The modified carbon black of any preceding or following embodiment/feature/aspect, wherein said PAH content is 10 ppm or less.

12. The modified carbon black of any preceding or following embodiment/feature/aspect, wherein said PAH content is from 0.001 ppm to 8 ppm.

13. The modified carbon black of any preceding or following embodiment/feature/aspect, wherein said carbon black is surface deactivated.

14. The modified carbon black of any preceding or following embodiment/feature/aspect, wherein said carbon black is a reinforcing grade of carbon black having at least 10% reduction in at least one surface activation property, as compared to a carbon black having about the same STSA and having no attached or adsorbed chemical group.

15. The modified carbon black of any preceding or following embodiment/feature/aspect, wherein said surface activation property is measured as bound rubber content of an elastomer composite comprising said modified carbon black.

16. The modified carbon black of any preceding or following embodiment/feature/aspect, wherein said surface activation property is at least one reinforcement performance property.

17. The modified carbon black of any preceding or following embodiment/feature/aspect, wherein said reinforcement performance property is stress/strain.

18. The modified carbon black of any preceding or following embodiment/feature/aspect, wherein said surface activation property is at least one interfacial potential property.

19. The modified carbon black of any preceding or following embodiment/feature/aspect, wherein said carbon black is annealed.

20. The modified carbon black of any preceding or following embodiment/feature/aspect, wherein said carbon black is a reinforcing grade of carbon black.

21. The modified carbon black of any preceding or following embodiment/feature/aspect, wherein said modified carbon black comprises a carbon black having attached thereon at least one chemical group.

22. The modified carbon black of any preceding or following embodiment/feature/aspect, wherein said modified carbon black comprises a carbon black having adsorbed thereon at least one chemical group.

23. The modified carbon black of any preceding or following embodiment/feature/aspect, wherein the adsorbed group is a triazole comprising:

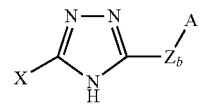

or

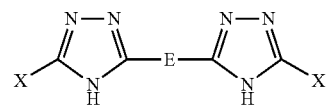

or tautomers thereof;

wherein $Z_b$ is an alkylene group, where b is 0 or 1;

X, which is the same or different, is H, $NH_2$, SH, $NHNH_2$, CHO, COOR, COOH, $CONR_2$, CN, $CH_3$, OH, NDD', or $CF_3$;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x$ $O(CH_2)_z$, $(CH_2)_x$ $NR(CH_2)_z$, or $(CH_2)_x$ $S(CH_2)_z$, where x is 1 to 6, z is 1 to 6, and w is 2 to 6;

E is a polysulfur-containing group; and said triazole is optionally N— substituted with an NDD' substituent, where D and D', which are the same or different, are H or $C_1$-$C_4$ alkyl.

24. The modified carbon black of any preceding or following embodiment/feature/aspect, wherein said triazole comprises:

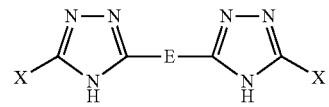

or tautomers thereof, and

E is $S_w$, where w is 2 to 8, SSO, $SSO_2$, $SOSO_2$, $SO_2SO_2$.

25. The modified carbon black of any preceding or following embodiment/feature/aspect, wherein said triazole comprises:

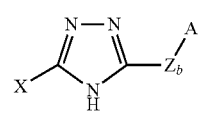

or tautomers thereof.

26. The modified carbon black of any preceding or following embodiment/feature/aspect, wherein said triazole is:

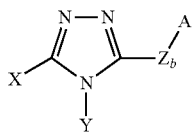

or tautomers thereof, and
wherein Y is H or NH$_2$.

27. The modified carbon black of any preceding or following embodiment/feature/aspect, wherein said carbon black has adsorbed thereon: 3-amino-1,2,4-triazole-5-thiol, 3-amino-1,2,4-triazol-5-yl disulfide, 1,2,4-triazole-3-thiol, or 1,2,4-triazol-3-yl disulfide, or any combination thereof.

28. The modified carbon black of any preceding or following embodiment/feature/aspect, having adsorbed thereon a pyrazole comprising:

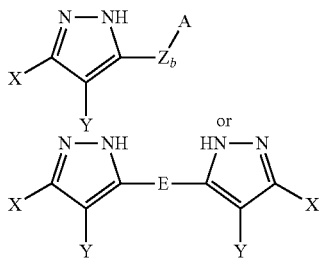

or tautomers thereof;
wherein $Z_b$ is an alkylene group, where b is 0 or 1;
X and Y are independently H, NH$_2$, SH, NHNH$_2$, CHO, COOR, COOH, CONR$_2$, CN, CH$_3$, OH, NDD', or CF$_3$, or Y is R, where each X and Y are the same or different;
A is a functional group that is S$_k$R, SSO$_3$H, SO$_2$NRR', SO$_2$SR, SNRR', SNQ, SO$_2$NQ, CO$_2$NQ, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and which are the same or different, are hydrogen; branched or unbranched C$_1$-C$_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8 when R is H and otherwise k is 2 to 8;
Q is (CH$_2$)$_w$, (CH2)$_x$ O(CH$_2$)$_z$, (CH$_2$)$_x$ NR(CH$_2$)$_z$, or (CH$_2$)$_x$ S(CH$_2$)$_z$, where x is 1 to 6, z is 1 to 6, and w is 2 to 6; and
D and D', which are the same or different, are H or C$_1$-C$_4$ alkyl.
E is a polysulfur-containing group.

29. The modified carbon black of any preceding or following embodiment/feature/aspect, wherein the adsorbed group is:
a) at least one triazole;
b) at least one pyrazole; or
any combination thereof, wherein said modified filler improves abrasion resistance when present in an elastomer composition compared to said filler that is not modified.

30. The modified carbon black of any preceding or following embodiment/feature/aspect, wherein a) is present and is a 1,2,4 triazole.

31. The modified carbon black of any preceding or following embodiment/feature/aspect, wherein a) or b) include a sulfur-containing substituent.

32. The modified carbon black of any preceding or following embodiment/feature/aspect, further comprising at least one chemical group attached to said carbon black.

33. The modified carbon black of any preceding or following embodiment/feature/aspect, wherein said chemical group is at least one organic group.

34. The modified carbon black of any preceding or following embodiment/feature/aspect, wherein said organic group comprises:
a) at least one triazole;
b) at least one pyrazole;
c) at least one imidazole; or
any combinations thereof.

35. The modified carbon black of any preceding or following embodiment/feature/aspect, wherein said organic group is triazole attached to said carbon black and comprises:

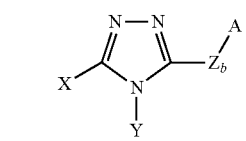

or tautomers thereof;
wherein $Z_b$ is an alkylene group, where b is 0 or 1;
X comprises a bond to the filler;
Y is H, alkyl, aryl, or NH$_2$;
A is a functional group that is S$_k$R, SSO$_3$H, SO$_2$NRR', SO$_2$SR, SNRR', SNQ, SO$_2$NQ, CO$_2$NQ, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;
where R and R', which are the same or different, are hydrogen; branched or unbranched C$_1$-C$_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;
k is an integer from 1 to 8; and
Q is (CH$_2$)$_w$, (CH2)$_x$ O(CH$_2$)$_z$, (CH$_2$)$_x$ NR(CH$_2$)$_z$, or (CH$_2$)$_x$ S(CH$_2$)$_z$, where x is 1 to 6, z is 1 to 6, and w is 2 to 6.

36. The modified carbon black of any preceding or following embodiment/feature/aspect, wherein said organic group is triazole attached to said carbon black and comprises:

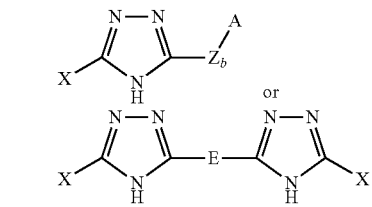

or tautomers thereof;
wherein $Z_b$ is an alkylene group, where b is 0 or 1;
at least one X comprises a bond to the filler, and any remaining X comprises a bond to the filler or a functional group;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6;

E is a polysulfur-containing radical; and said triazole is optionally N— substituted with an NDD' substituent, where D and D', which are the same or different, are H or $C_1$-$C_4$ alkyl.

37. The modified carbon black of any preceding or following embodiment/feature/aspect, wherein said organic group is triazole attached to said carbon black filler and comprises:

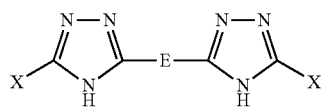

or tautomers thereof;

and at least one X is said bond and the other X is H, $NH_2$, or OH.

38. The modified carbon black of any preceding or following embodiment/feature/aspect, wherein said organic group is triazole attached to said carbon black and comprises:

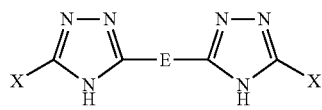

or tautomers thereof;

where E is $S_2$,

X is H, OH, or $NH_2$, or comprises a bond to the filler, and where at least one X comprises a bond to the filler.

39. The modified carbon black of any preceding or following embodiment/feature/aspect, wherein said organic group is triazole attached to said carbon black and is a 1,2,4-triazol-3-yl group.

40. The modified carbon black of any preceding or following embodiment/feature/aspect, wherein said organic group is triazole attached to said carbon black and is a 3-mercapto-1,2,4-triazol-5-yl group.

41. The modified carbon black of any preceding or following embodiment/feature/aspect, wherein said organic group is imidazole attached to said carbon black.

42. The modified carbon black of any preceding or following embodiment/feature/aspect, wherein said imidazole is attached to said carbon black and comprises:

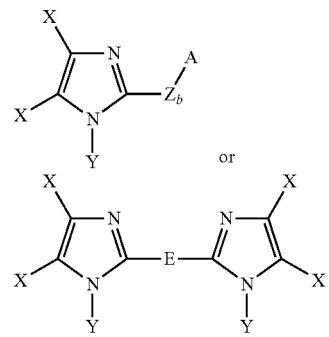

or tautomers thereof;

wherein $Z_b$ is an alkylene group, where b is 0 or 1;

each X comprises a bond to the filler, H, alkyl, aryl, or $NH_2$, with the proviso that at least one X comprises a bond;

Y is H or $NH_2$;

A is a functional group that is $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$; $(CH2)_x O(CH_2)_z$, $(CH_2)_x NR(CH_2)_z$, or $(CH_2)_x S(CH_2)_z$, where x is 1 to 6, z is 1 to 6, and w is 2 to 6; and E is a polysulfur-containing group.

43. The modified carbon black of any preceding or following embodiment/feature/aspect, wherein said organic group comprises an aliphatic group or an aromatic group.

44. The modified carbon black of any preceding or following embodiment/feature/aspect, wherein said organic group comprises an alkyl group or aromatic group having at least functional group that is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, $SNRR'$, $SNQ$, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{12}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are independently integers from 1 to 6.

45. The modified carbon black of any preceding or following embodiment/feature/aspect, wherein said organic group comprises an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, $SNRR'$, $SNQ$, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_x O(CH_2)_z$, $(CH_2)_x NR(CH_2)_z$, or $(CH_2)_x S(CH_2)_z$, where w is an integer from 2 to 6 and x and z are independently integers from 1 to 6, and y is an integer from 1 to the total number of —CH radicals in the aromatic radical.

46. The modified carbon black of any preceding or following embodiment/feature/aspect, wherein said chemical group is attached and comprises an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_x O(CH_2)_z$, $(CH_2)_x(NR(CH_2)_z$, or $(CH_2)_x S(CH_2)_z$, where w is an integer from 2 to 6 and x and z are independently integers from 1 to 6, and y is an integer from 1 to the total number of —CH radicals in the aromatic radical.

47. The modified carbon black of any preceding or following embodiment/feature/aspect, wherein said Ar comprises a triazole group.

48. The modified carbon black of any preceding or following embodiment/feature/aspect, wherein said Ar comprises a pyrazole group.

49. The modified carbon black of any preceding or following embodiment/feature/aspect, wherein said Ar comprises an imidazole group.

50. The modified carbon black of any preceding or following embodiment/feature/aspect, wherein said organic group is at least one aminomethylphenyl group.

51. The modified carbon black of any preceding or following embodiment/feature/aspect, wherein said organic group is X—$C_6H_4$—S—S—$C_6H_4$—X, where at least one X is a bond to the carbon black and the other X is a bond to the carbon black or a functional group.

52. The modified carbon black of any preceding or following embodiment/feature/aspect, wherein said organic group comprises at least one aromatic sulfide or polysulfide.

53. The modified carbon black of any preceding or following embodiment/feature/aspect, having an adsorbed amount of from 0.01 to 10 micromoles of heterocyclic groups/$m^2$ surface area of carbon black.

54. The modified carbon black of any preceding or following embodiment/feature/aspect, having an attached amount of from 0.01 to 6 micromoles of heterocyclic groups/$m^2$ surface area of carbon black.

55. The modified carbon black of any preceding or following embodiment/feature/aspect, wherein said modified carbon black improves abrasion resistance when present in an elastomer composition compared to a carbon black that is not modified, but has the same PAH content and substantially similar or same STSA.

56. The modified carbon black of any preceding or following embodiment/feature/aspect, wherein said abrasion resistance is increased by at least 10%.

57. The modified carbon black of any preceding or following embodiment/feature/aspect, wherein said abrasion resistance is increased by at least 50%.

58. The modified carbon black of any preceding or following embodiment/feature/aspect, wherein said abrasion resistance is increased by at least 75%.

59. The modified carbon black of any preceding or following embodiment/feature/aspect, wherein said abrasion resistance is increased by at least 100%.

60. The modified filler of any preceding or following embodiment/feature/aspect, wherein said modified carbon black improves abrasion resistance when present in an elastomer composition compared to said carbon black that is not modified, but has the same PAH content and STSA, and improves (decreases) hysteresis when present in said elastomer composition compared to said carbon black that is unmodified, but has the same PAH content.

61. The modified filler of any preceding or following embodiment/feature/aspect, wherein said hysteresis is improved (decreased) by at least 5%.

62. The modified carbon black of any preceding or following embodiment/feature/aspect, wherein said hysteresis is improved (decreased) by at least 10%.

63. The modified carbon black of any preceding or following embodiment/feature/aspect, wherein said hysteresis is improved (decreased) by at least 20%.

64. The modified carbon black of any preceding or following embodiment/feature/aspect, wherein said abrasion resistance is increased by at least 10% and said hysteresis is improved (decreased) by at least 5%.

65. The modified carbon black of any preceding or following embodiment/feature/aspect, wherein said abrasion resistance is increased by at least 50% and said hysteresis is improved (decreased) by at least 10%.

66. The modified carbon black of any preceding or following embodiment/feature/aspect, wherein said abrasion resistance is increased by at least 75% and said hysteresis is improved (decreased) by at least 15%.

67. The modified carbon black of any preceding or following embodiment/feature/aspect, wherein said chemical group is attached and is a triazole comprising:

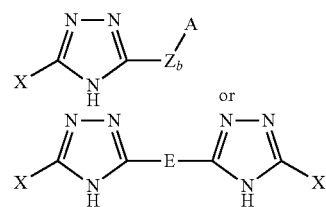

or tautomers thereof, wherein wherein $Z_b$ is an alkylene group, where b is 0 or 1;

at least one X comprises a bond to the filler and any remaining X comprises a bond to the filler or a functional group;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6;

E is a polysulfur-containing radical; and said triazole is optionally N— substituted with an NDD' substituent, where D and D', which are the same or different, are H or $C_1$-$C_4$ alkyl.

68. The modified carbon black of any preceding or following embodiment/feature/aspect, wherein said triazole is:

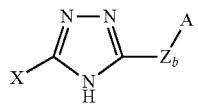

or tautomers thereof.

69. The modified carbon black of any preceding or following embodiment/feature/aspect, wherein said triazole is:

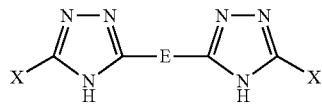

or tautomers thereof.

70. The modified carbon black of any preceding or following embodiment/feature/aspect, having an attached amount of from 0.1 to 6 moles/m² filler surface.

71. The modified carbon black of any preceding or following embodiment/feature/aspect, wherein said modified carbon black improves hysteresis when present in an elastomeric composition compared to said carbon black that is unmodified.

72. The modified carbon black of any preceding or following embodiment/feature/aspect, wherein said hysteresis is decreased by at least 5%.

73. The modified carbon black of any preceding or following embodiment/feature/aspect, wherein said hysteresis is decreased by at least 10%.

74. The modified carbon black of any preceding or following embodiment/feature/aspect, wherein said hysteresis is decreased by at least 20%.

75. The modified carbon black of any preceding or following embodiment/feature/aspect, wherein said chemical group is attached $Ar(CH_2)_q S_k (CH_2)_r Ar'$, wherein Ar and Ar' are the same or different and are arylene or heteroarylene; k is an integer from 1 to 8; q is an integer from 0 to 4; and r is an integer from 0 to 4.

76. The modified carbon black of any preceding or following embodiment/feature/aspect, wherein Ar and Ar' are an arylene; k is an integer from 1 to 8; and q and r are 0.

77. The modified carbon black of any preceding or following embodiment/feature/aspect, wherein Ar and Ar' are phenylene; k is an integer from 2 to 4; and q and r are 0.

78. The modified carbon black of any preceding or following embodiment/feature/aspect, wherein k is 2.

79. The modified carbon black of any preceding or following embodiment/feature/aspect, wherein Ar and Ar' are a heteroarylene; k is an integer from 1 to 8; and q and r are 0.

80. The modified carbon black of any preceding or following embodiment/feature/aspect, wherein Ar and Ar' are benzothiazolylene; k is an integer from 2 to 4; and q and r are 0.

81. The modified carbon black of any preceding or following embodiment/feature/aspect, wherein k is 2.

82. The modified carbon black of any preceding or following embodiment/feature/aspect, wherein said chemical group is $Ar(CH_2)_q S_k (CH_2)_r Ar'$, wherein Ar is an arylene or a heteroarylene; Ar' is an aryl or a heteroaryl; k is an integer from 1 to 8; q is an integer from 0 to 4; and r is an integer from 0 to 4.

83. The modified carbon black of any preceding or following embodiment/feature/aspect, wherein Ar is an arylene; Ar' is an aryl; k is an integer from 1 to 8; and q and r are 0.

84. The modified carbon black of any preceding or following embodiment/feature/aspect, wherein Ar is phenylene; Ar' is phenyl; k is an integer from 2 to 4; and q and r are 0.

85. The modified carbon black of any preceding or following embodiment/feature/aspect, wherein Ar is phenylene; Ar' is a heteroaryl; k is an integer from 1 to 8; and q and r are 0.

86. The modified carbon black of any preceding or following embodiment/feature/aspect, wherein Ar is phenylene; Ar' is benzothiazolyl; k is an integer from 2 to 4; and q and r are 0.

87. The modified carbon black of any preceding or following embodiment/feature/aspect, wherein said chemical group is —($C_6H_4$)—$S_k$—($C_6H_4$)—$NH_2$ wherein k is an integer from 2 to 8.

88. The modified carbon black of any preceding or following embodiment/feature/aspect, wherein said chemical group is —($C_6H_4$)—$S_k$—($C_6H_4$)—$NH_2$ and k is 2.

89. The modified carbon black of any preceding or following embodiment/feature/aspect, wherein the carbon black is not graphitized.

90. An elastomeric composition comprising the modified carbon black of any preceding or following embodiment/feature/aspect and at least one elastomer.

91. An article of manufacture comprising the elastomeric composition of any preceding or following embodiment/feature/aspect.

92. The article of any preceding or following embodiment/feature/aspect, wherein said article is a tire or a component thereof.

93. The article of any preceding or following embodiment/feature/aspect, wherein said article is a tire tread or tire sidewall.

94. A method to improve abrasion resistance in an elastomeric composition comprising introducing at least one modified carbon black of any preceding or following embodiment/feature/aspect into said elastomeric composition prior to curing.

95. A method to improve (decrease) hysteresis in an elastomeric composition comprising introducing at least one modified carbon black of any preceding or following embodiment/feature/aspect into said elastomeric composition prior to curing.

96. A method to increase abrasion resistance and decrease hysteresis in an elastomeric composition comprising introducing the modified carbon black of any preceding or following embodiment/feature/aspect into said elastomeric composition prior to curing.

97. A method to produce the modified carbon black of any preceding or following embodiment/feature/aspect, said method comprising:

introducing into a reactor at least one carbon black yielding feedstock in one or more introduction points and combining the at least one carbon black yielding feedstock with a stream of hot gases to form carbon black and PAH species in a reaction stream, and said reaction stream travels downstream from said one or more introduction points and exposing said reaction stream to a temperature sufficient to substantially destroy said PAH species and then reaction quenching the reaction stream containing the carbon black, and recovering said carbon black having a PAH 22 of 75 ppm or less after said reaction quenching;

and then attaching and/or adsorbing one or more chemical groups onto said carbon black.

98. A method to produce the modified carbon black of any preceding or following embodiment/feature/aspect, said method comprising:

introducing into a reactor at least one carbon black yielding feedstock in one or more introduction points and combining the at least one carbon black yielding feedstock with a stream of hot gases to form carbon black and PAH species in a reaction stream, and said reaction stream travels downstream from said one or more introduction points and exposing said reaction stream to a temperature sufficient to substantially destroy said PAH species and at least partially surface deactivates said carbon black and then reaction quenching the reaction stream containing the carbon black, and recovering said carbon black having a PAH 22 of 75 ppm or less after said reaction quenching;

and then attaching and/or adsorbing one or more chemical groups onto said carbon black to at least partially restore one or more properties lost to surface deactivation and form said modified carbon black.

99. The method of any preceding or following embodiment/feature/aspect, wherein said residence time is 10 to 500 ms.

100. The method of any preceding or following embodiment/feature/aspect, wherein said residence time is 30 to 300 ms at a temperature of from about 1200 deg C. to about 1800 deg C.

101. The method of any preceding or following embodiment/feature/aspect, wherein the temperature is achieved by introducing one or more oxidant containing streams to the reaction stream after surface area of carbon black has formed and prior to said reaction quenching.

102. A method to produce modified carbon black, said method comprising:

subjecting a starting carbon black having a PAH content of over 75 ppm to a temperature treatment of from 1200° C. to 1800° C. for a period of time of from 30 minutes to 4 hours sufficient to anneal the carbon black and substantially destroy said PAH content so as to have a reduced PAH content of 50 ppm or less, and then attaching and/or adsorbing one or more chemical groups into said carbon black.

103. The method of any preceding or following embodiment/feature/aspect, wherein said reduced PAH content is 10 ppm or less.

104. The method of any preceding or following embodiment/feature/aspect, wherein said starting carbon black is surface deactivated during said temperature treatment.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

The carbon black samples that are included in the study are materials manufactured by Cabot Corporation with a furnace process (see, J. B. Donnet, R. C. Bansal, M. J. Wang, "Carbon Black," SCIENCE AND TECHNOLOGY, $2^{nd}$ Edition, Marcel Dekker, NY, 1993; and M. J. Wang, C. A. Gray, S. A. Reznek, K. Mahmud, Y. Kutsovsky, "Carbon Black," in KIRK-OTHMER ENCYCLOPEDIA OF CHEMICAL TECHNOLOGY, John Willey & Sons, 2005, 4, 761). The properties of carbon black are defined by the ASTM (see, ASTM D 1765-03 Standard Classification System for Carbon Blacks Used in Rubber Products) and by the Cabot specifications (see, Web site www.cabot-corp.com).

The carbon blacks were evaluated in the SBR rubber compound by the ASTM (see, ASTM D 3191-02 Standard Test Methods for Carbon Black in SBR—Recipe and Evaluation Procedures). Typical rubber mixing processes and tests are described in Maurice Morton, RUBBER TECHNOLOGY, 3rd Edition, Van Norstrand Reinhold Company, New York, 1987, and 2nd Edition, Van Norstrand Reinhold Company, New York, 1973). Testing of bound rubber is described in G. Kraus, RUBBER CHEM TECHN, v 38, 1070 (1965) and S. Wolff, M-J Wang, E-H Tan, RUBBER CHEM TECHN, v 66, 163 (1993). Max Tan Delta is a measure of hysteresis (rolling resistance) of rubber. It was tested using an ARES/Rheometrics Dynamic Spectrometer II (RDS II, Rheometrics, Inc., N.J.) operated in a torsion strain mode (shear). The measurements were performed at 0° C. for strain sweeps with double strain amplitude (DSA) ranging from 0.2 to 120%, at a constant frequency of 10 Hz. Wear resistance was tested using the Cabot Abrader (see, U.S. Pat. No. 4,995,197).

Testing of PAH concentrations was conducted by the Cabot procedure that includes extraction by toluene with GCMS analysis for 22 individual PAHs, as identified in FIG. 1. The method is described in 21 C.F.R. part 17B, FDA FEDERAL REGISTER, v62, #90, Friday, May 9, 1997.

Example 1

Heat Treated Carbon Black (CB-2)

A carbon black sample made by Cabot Corporation (CB-1) (1.5 Kg) with an iodine number of 80 $m^2/g$, an STSA surface area of 75 $m^2/g$, and an OAN of 102 mL/100 g was heated in a tube furnace to 1400 C, held at 1400 C for two hours and then cooled to room temperature to form an annealed carbon black (CB-2) with an STSA surface area of 76 $m^2/g$. The heating rate was 2 C/min, and the cooling time was about 24 hours. Several batches were prepared and then mixed together before use. All heating operations were carried out under an argon atmosphere.

Example 2

Preparation of a Modified Carbon Black Product (CB-3)

A 20 L Ross mixer was charged with 11.26 Kg of water, 2.50 kg of the carbon black (CB-2) of Example 1 and 1330 g of a 0.235 mmol/g solution of 3-amino-1,2,4-triazol-5-yl disulfide sulfate salt. After heating to 70 C, 216 g of a 20% solution of NaNO2 in water was added over 10 min. The mixture was allowed to stir at 70 C for an hour, and was cooled to room temperature. An aqueous 40% NaOH solution (37.6 g) was added and the mixture was stirred an additional 5 min. The mixture was filtered, and the product was washed with water until the conductivity was about 4800 uS/cm. The product was dried at 100 C. A sample of the carbon black product that had been subjected to Soxhlet extraction with methanol overnight had 1.11% S, compared to 0.86% S for the carbon black of Example 1.

Example 3

Preparation of a Modified Carbon Black Product (CB-4)

A solution of 5.18 g NaNO2 in 49 g of water was added over a period of about five minutes to a stirring mixture of 300 g of the carbon black (CB-2) of Example 1, 2600 g water, 9.31 g 4,4' aminophenyl disulfide and 3.69 g conc H2SO4 at 70 C. The mixing was continued for 60 minutes at 70 C. The mixture was then cooled to room temperature. The product was collected by filtration, washed with 3 L of water and dried under vacuum at 70 C. A sample of the carbon black product that had been subjected to Soxhlet extraction with methanol overnight had 1.64% S, compared to 0.86% S for the carbon black of Example 1. The product was mixed with a second batch that had been prepared under similar conditions.

Example 4

Preparation of a Modified Carbon Black Product (CB-7)

A 20 L Ross mixer was charged with 11.26 Kg of water and 3.00 kg of carbon black and 1596 g of a 0.235 mmol/g solution of 3-amino-1,2,4-triazol-5-yl disulfide sulfate salt. The carbon black had an STSA surface area of 139 m$^2$/g and an iodine number of 165, a OAN of 96 mL/100 g and a PAH content of 0.85 ppm. After heating to 70 C, 259 g of a 20% solution of NaNO2 in water was added over 10 min. The mixture was allowed to stir at 70 C for an hour, and was cooled to room temperature. An aqueous 40% NaOH solution (37.6 g) was added and the mixture was stirred an additional 5 min. The mixture was filtered, and the product was washed with water until the conductivity was about 4700 uS/cm. The product was dried at 100 C. A sample of the carbon black product that had been subjected to Soxhlet extraction with methanol overnight had 0.97% S, compared to 0.63% S for the untreated carbon black. The carbon black that was modified in this example was formed (in pilot plant quantities) in the same type of reactor and by the same type of process as Cabot Corporation's commercially-available VULCAN 7H carbon black, except the reaction quench was delayed by extending where the reaction quenching occurs instead at 29 ft in the reactor and this caused annealing. The annealed carbon black is CB-6. A normal reaction quench (i.e., at 6 ft) carbon black (the unannealed version CB-5) having a STSA of 139 m$^2$/g, an iodine number of 138 and an OAN of 100 cc/100 g, was manufactured and tested for comparative purposes.

Example 5

Preparation and Testing of Elastomer Compositions

In the experiments, the modified carbon black of the present invention was used in a solution polymerized styrene-butadiene copolymer with 25% styrene and 50% vinyl butadiene and 25% oil content (sSBR) formulation and in a natural rubber (NR) formulation to show the benefits of using the modified carbon blacks of the present invention. The following tests were used for the data in the tables:

100% modulus (Mpa); ASTM D 412-06 Standard Test Methods for Carbon Black in SBR—Recipe and Evaluation Procedures.

300% modulus (Mpa); ASTM D 412-06 Standard Test Methods for Carbon Black in SBR—Recipe and Evaluation Procedures.

ratio of 300% modulus/100% modulus (M300%/M100%); ASTM D 412-06 Standard Test Methods for Carbon Black in SBR—Recipe and Evaluation Procedures.

bound rubber (%); S. Wolff, M-J Wang, E-H Tan, Rubber Chem Techn, v 66, 163 (1993).

max tan delta @ 0° C. tested with ARES/Rheometrics Dynamic Spectrometer II (RDS II, Rheometrics, Inc., N.J) operated in a torsion strain mode (shear). The measurements were performed at 0° C. for strain sweeps with double strain amplitude (DSA) ranging from 0.2 to 120%, at a constant frequency of 10 Hz.

The sSBR formulation and the NR formulation are set forth in Tables 1 and 2. The elastomer composites used herein were prepared by mixing the polymer with either a) a control carbon black (unannealed or "as-is"), b) an annealed carbon black with low PAHs per the present invention (but not having any attached or adsorbed chemical groups), and c) a modified carbon black of the present invention (having been annealed or treated to remove PAH content, and subsequently treated to have a chemical group attached and/or adsorbed on it).

TABLE 1 sSBR formulation

| Ingredients | phr |
|---|---|
| Master Batch | |
| BUNA VSL 5025-2 Polymer (sSBR) | 96.25 |
| Buna CB 24 polybutadiene homopolymer | 30 |
| Carbon Black | 72 |
| VivaTec 500 (oil) | 1.75 |
| 6PPD (antioxidant) | 1 |
| WINGSTAY 100 (antioxidant) | 1 |
| Sunproof Improved (wax) | 2.5 |
| ZINC OXIDE | 3 |
| Stearic Acid | 2 |
| Final Pass | |
| CBS (accelerator) | 1.1 |
| SULFUR | 1.4 |
| DPG (accelerator) | 0.3 |
| Total | 212.30 |

TABLE 2

NR formulation

| Ingredient | phr |
|---|---|
| Master Batch | |
| TSR-20 Polymer (NR) | 100 |
| Carbon Black | 50 |
| Calight RPO (oil) | 2.5 |
| Zinc Oxide | 5 |
| Stearic Acid | 3 |
| Agerite Resin D (antioxidant) | 1.5 |
| 6PPD (antioxidant) | 1.5 |
| Sunproof Improved (wax) | 1.5 |
| Final Pass | |
| Sulfur | 1.2 |
| TBBS (accelerator) | 1.4 |
| TOTAL | 167.6 |

The components used in for the elastomer composites (as set forth in the Tables) were mixed following a three-stage mixing in Brabender Plasti-corder EPL-V mixer for the sSBR or a two-stage mixing for the NR formulation. The first stage involved adding the polymer and carbon black followed by the remaining ingredients except the curatives at a rotor speed of 50 rpm and starting temperature of 50 C and then raising to a temperature of 140 C, wherein the material was then milled using 4 crosscuts and 2 end rolls. The second stage followed with just mixing at a rotor speed of 80 rpm and a starting temperature of 50 C, wherein the temperature went to 150 C. Again the material was then milled using 4 crosscuts and 2 end rolls. Then a third stage of mixing was performed with the addition of the curatives at a rotor speed of 50 rpm and a starting temperature of 50 C, wherein the temperature went to 110 C. Again the material was then milled using 4 crosscuts and 2 end rolls.

The components in first-stage were mixed for a total of 30 minutes before passing through the open mill as indicated. The milled compound from first-stage mixing was kept at room temperature for at least 2 h before second stage mixing. Similarly, the components in second-stage were mixed for a total of 30 minutes before passing through the open mill as indicated. The milled compound from second-stage mixing was kept at room temperature for at least 2 h before third stage mixing. The curatives were then mixed in the third stage for 60 minutes.

In the two-stage milling, this procedure was per ASTM D3192 using the Brabender mixer, except using the formulation in Table 2.

Table 3 sets forth the carbon blacks used in the elastomer formulations. It is noted that in the elastomer formulations, either the "control" carbon black (no annealing and no attached/groups was present, or the carbon black was "annealed only" (no attachment/adsorbed groups), or the carbon black was annealed and has attached/adsorbed chemical groups (present invention).

TABLE 3

| CB | STSA | OAN | I2 | Spec 20 | PAH, ppm | BaP, ppm |
|---|---|---|---|---|---|---|
| CB-1 (control) | 75 | 102 | 80.3 | 98.5 | 89 | 0.076 |
| CB-2- (annealed only) | 76 | NA | 95 | 98/5 | 0.036 | <0.001 |
| CB-5 (control) | 132.3 | 100.4 | 138.1 | 92.5 | 760 | 5.9 |
| CB-6 (annealed only) | 139.1 | 96.1 | 164.8 | 99 | 0.85 | 0.002 |

In Table 3, if measured, the STSA, OAN, I2No, Spec20 and PAH and BaP measurements are provided for the carbon blacks. The STSA, OAN, and $I_2$No is measured per ASTM D1765-10. Spec 20 (toluene discoloration) measured per ASTM 1618-99 (2011). The PAH is a PAH 2 measurement and BaP are defined in the application.

CB-1 carbon black, is a furnace carbon black made by Cabot Corporation in one of their carbon black reactors. CB-1 carbon black is "as-is" without any treatment to remove PAH levels and does not have any attached or adsorbed chemical groups. CB-1 was used as a control to show the effects of treatment to remove PAH levels and rubber properties (or other reinforcement properties).

CB-2 carbon black (of Example 1) was CB-1 carbon black that was subjected to high heat treatment at 1400 C for 2 hrs in a furnace which reduced the PAH levels significantly as shown in Table 3. As can also be seen, the surface activity was greatly affected (deactivated), for instance as shown by the I2No, that went up significantly, reflecting the effects of the heat treatment.

CB-2 carbon black, as shown in Table 4 and Table 5 below, was then treated to attach/adsorb a chemical group, as described in Example 2 to obtain CB-3, or as described in Example 3 to obtain CB-4. It is noted that several experiments with the various CB1-7 were repeated as shown in the tables below.

TABLE 4 sSBR compounds

| Run | CB sample | Surface activity BR MB % | Hysteresis max tan D-60 | Strength M300/M100 |
|---|---|---|---|---|
| 1 | CB-1 (control) | 35.7 | 0.257 | 4.12 |
| 2 | CB-6 (annealed only) | 28.5 | 0.386 | 3.34 |
| 3 | CB-5 (control) | 40.5 | 0.363 | 4.01 |
| 4 | CB-2 (annealed only) | 7.4 | 0.325 | 2.23 |
| 5 | CB-3 (present invention) | 18.3 | 0.255 | 3.00 |
| 6 | CB-4 (present invention) | 37.2 | 0.252 | 3.33 |
| 7 | CB-6 (annealed) | 28.5 | 0.377 | 3.48 |
| 8 | CB-5 (control) | 37.4 | 0.364 | 3.91 |
| 9 | CB-7 (present invention) | 35.6 | 0.284 | 3.77 |
| 10 | CB-2 (annealed only) | 8.2 | 0.333 | 2.17 |
| 11 | CB-7 (present invention) | 39.6 | 0.286 | 3.83 |

TABLE 5

NR compounds

| Run | CB Sample | Surface activity BR | Hysteresis TDmax@60 C. | Strength M300/M100 |
|---|---|---|---|---|
| 12 | CB-1 | 43.8 | 0.169 | 5.31 |
| 13 | CB-2 | 33 | 0.186 | 3.16 |
| 14 | CB-2 | 35 | 0.198 | 3.17 |
| 15 | CB-3 | 44 | 0.138 | 4.24 |
| 16 | CB-3 | 46 | 0.131 | 4.34 |
| 17 | CB-6 | 76 | 0.226 | 5.00 |
| 18 | CB-6 | 76 | 0.223 | 5.03 |
| 19 | CB-5 | 76 | 0.203 | 5.31 |
| 20 | CB-5 | 72 | 0.196 | 5.39 |
| 21 | CB-7 | 72 | 0.137 | 5.06 |
| 22 | CB-7 | 70 | 0.15 | 4.96 |
| 23 | CB-6 | 72 | 0.224 | 4.80 |
| 24 | CB-5 | 74 | 0.205 | 5.62 |

Similarly, CB-5 carbon black was similar to a commercially available carbon black from Cabot Corporation. This carbon black is "as-is" without any treatment to destroy PAH species and does not have any attached or adsorbed chemical groups. CB-5 carbon black was used as a control to show the effects of treatment to destroy PAH species and to show rubber properties (or other reinforcement properties).

Then the same technique use to make CB-5 carbon black was followed except the quench length was extended from 6 ft to 29 ft. This resulted in reduced PAH levels as shown in Table 3—CB-6. As can also been seen, the surface activity was greatly affected (deactivated), for instance as shown by the I2No, that went up significantly, reflecting the effects of the delayed quench.

CB-6 was then treated to attach/adsorb a chemical group as described in Example 4 to form CB-7.

The elastomer compositions (sSBR or NR) were prepared using one of these blacks and the bound rubber, hysteresis, and strength (M300/M100) were measured. The results are set forth in Table 4 for the sSBR formulations and in Table 5 for the NR formulations.

As can be seen, the surface activity as shown by the bound rubber went dramatically down with the destruction of PAHs (CB-2 or CB-6) (and with no attachment/adsorption of chemical groups). Then with the attachment/adsorption of chemical groups, the bound rubber was at least partially restored in each instance (CB-3, CB-4, and CB-7). The same effects were seen with strength (M300/M100). With hysteresis, the tan delta 60 C was also restored at least partially with the attachment/adsorption of chemical groups. It is noted that CB-2 and CB-6 (without any attachment/adsorption of chemical groups) was deemed unacceptable as a reinforcement black in an elastomer composition whereas the same black but treated with the attachment/adsorption of a chemical group was deemed and shown to be an acceptable reinforcement black.

Thus, with the present invention, as shown in the Examples, a low PAH carbon black can be made which has acceptable surface activity properties using the 2 step processes of the present invention which involves annealing the surface and then attaching and/or adsorbing chemical groups to at least partially restore the surface activity.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A modified carbon black having an STSA of from about 70 m²/g to about 250 m²/g, and having an annealed surface by a heat treatment, and wherein said modified carbon black is a furnace carbon black that is surface deactivated and has attached and/or adsorbed at least one chemical group.

2. The modified carbon black of claim 1, wherein said modified carbon black has a PAH 22 content of 75 ppm or less.

3. The modified carbon black of claim 1, wherein said modified carbon black has a PAH 22 content of from 0.001 ppm to 5 ppm.

4. A modified carbon black having a PAH content of 75 ppm or less, wherein the PAH content is determined based on a PAH 22 content, said modified carbon black is a furnace carbon black and has an annealed surface by a heat treatment, wherein said modified carbon black comprises a carbon black that is surface deactivated and has attached and/or adsorbed thereon at least one chemical group.

5. The modified carbon black of claim 4, wherein said PAH 22 content is from 0.001 ppm to 8 ppm.

6. The modified carbon black of claim 1, wherein said carbon black is a reinforcing grade of carbon black having at least 10% reduction in at least one surface activation property, as compared to a carbon black having about the same STSA and having no attached or adsorbed chemical group, and wherein said surface activation property is measured as bound rubber content of an elastomer composite comprising said modified carbon black, or is measured as at least one reinforcement performance property of an elastomer composite comprising said modified carbon black, wherein said reinforcement performance property is stress/strain, or wherein said surface activation property is at least one interfacial potential property.

7. The modified carbon black of claim 1, wherein said carbon black is a reinforcing grade of carbon black.

8. The modified carbon black of claim 1, wherein the adsorbed chemical group is a triazole comprising:

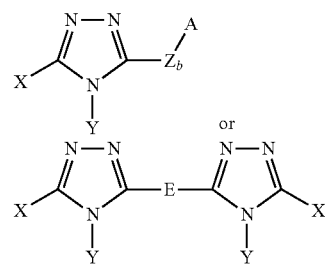

or tautomers thereof;

wherein $Z_b$ is an alkylene group, where b is 0 or 1;

X, which is the same or different, is H, $NH_2$, SH, $NHNH_2$, CHO, COOR, COOH, $CONR_2$, CN, $CH_3$, OH, NDD', or $CF_3$;

Y is H, or $NH_2$;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x$ $O(CH_2)_z$, $(CH_2)_x$ $NR(CH_2)_z$, or $(CH_2)_x$ $S(CH_2)_z$, where x is 1 to 6, z is 1 to 6, and w is 2 to 6;

E is a polysulfur-containing group; and said triazole is optionally N- substituted with an NDD' substituent, where D and D', which are the same or different, are H or $C_1$-$C_4$ alkyl.

9. The modified carbon black of claim 8, wherein said carbon black has adsorbed thereon: 3-amino-1,2,4-triazole-5-thiol, 3-amino-1,2,4-triazol-5-yl disulfide, 1,2,4-triazole-3-thiol, or 1,2,4-triazol-3-yl disulfide, or any combination thereof.

10. The modified carbon black of claim 1, having adsorbed thereon a pyrazole comprising:

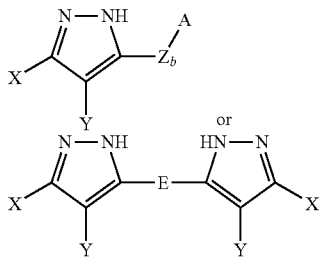

or tautomers thereof;

wherein $Z_b$ is an alkylene group, where b is 0 or 1;

X and Y are independently H, $NH_2$, SH, $NHNH_2$, CHO, COOR, COOH, $CONR_2$, CN, $CH_3$, OH, NDD', or $CF_3$, or Y is R, where each X and Y are the same or different;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which are the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8 when R is H and otherwise k is 2 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6; and D and D', which are the same or different, are H or $C_1$-$C_4$ alkyl, E is a polysulfur-containing group.

11. The modified carbon black of claim 1, wherein the adsorbed chemical group is:
a) at least one triazole;
b) at least one pyrazole; or
any combination thereof, wherein said modified filler improves abrasion resistance when present in an elastomer composition compared to said filler that is not modified.

12. The modified carbon black of claim 11, further comprising at least one chemical group attached to said carbon black, wherein said attached chemical group is at least one organic group, comprising:
a) at least one triazole;
b) at least one pyrazole;
c) at least one imidazole; or
any combinations thereof.

13. The modified carbon black of claim 12, wherein said organic group is a 1,2,4-triazol-3-yl group, a 3-mercapto-1,2,4-triazol-5-yl group, or imidazole.

14. The modified carbon black of claim 1, wherein said chemical group is attached and comprises an aromatic group having a formula AyAr—, wherein Ar is an aromatic radical and A is R, OR, COR, COOR, OCOR, a carboxylate salt, halogen, CN, $NR_2$, $SO_3H$, a sulfonate salt, NR(COR), $CONR_2$, $NO_2$, $PO_3H_2$, a phosphonate salt, a phosphate salt N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$-$C_{100}$ substituted or unsubstituted, saturated or unsaturated hydrocarbon, and k is an integer that ranges from 1-8, and $X^-$ is a halide or an anion derived from a mineral or organic acid, Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are independently integers from 1 to 6, and y is an integer from 1 to the total number of —CH radicals in the aromatic radical.

15. The modified carbon black of claim 14, wherein said Ar comprises a triazole group, a pyrazole group, or an imidazole group.

16. The modified carbon black of claim 14, wherein said organic group is at least one aminomethylphenyl group.

17. The modified carbon black of claim 1, wherein said modified carbon black improves abrasion resistance when present in an elastomer composition compared to a carbon black that is not modified, but has the same PAH content and similar STSA.

18. The modified filler of claim 1, wherein said modified carbon black improves abrasion resistance when present in an elastomer composition compared to said carbon black that is not modified, but has the same PAH content and STSA, and improves (decreases) hysteresis when present in said elastomer composition compared to said carbon black that is unmodified, but has the same PAH content.

19. The modified carbon black of claim 1, wherein said chemical group is attached and is a triazole comprising:

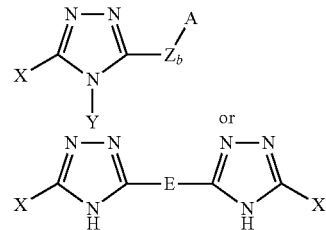

or tautomers thereof, wherein wherein $Z_b$ is an alkylene group, where b is 0 or 1;

at least one X comprises a bond to the filler and any remaining X comprises a bond to the filler or a functional group that is H, $NH_2$, SH, $NHNH_2$, CHO, COOR, COOH, $CONR_2$, CN, $CH_3$, OH, NDD', or $CF_3$, or is A, R or R';

Y is H, or $NH_2$;

A is a functional group that is $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), or 2-(1,3-dithiolanyl); or a linear, branched, aromatic, or cyclic hydrocarbon radical substituted with one or more of said functional group;

where R and R', which can be the same or different, are hydrogen; branched or unbranched $C_1$-$C_{12}$ unsubstituted or substituted alkyl, alkenyl, alkynyl; unsubstituted or substituted aryl; unsubstituted or substituted heteroaryl; unsubstituted or substituted alkylaryl; unsubstituted or substituted arylalkyl, arylene, heteroarylene, or alkylarylene;

k is an integer from 1 to 8;

Q is $(CH_2)_w$, $(CH2)_x O(CH_2)_z$, $(CH_2)_x NR(CH_2)_z$, or $(CH_2)_x S(CH_2)_z$, where x is 1 to 6, z is 1 to 6, and w is 2 to 6;

E is a polysulfur-containing radical; and said triazole is optionally N— substituted with an NDD' substituent, where D and D', which are the same or different, are H or $C_1$-$C_4$ alkyl.

20. The modified carbon black of claim 1, wherein said modified carbon black improves hysteresis when present in an elastomeric composition compared to said carbon black that is unmodified.

21. The modified carbon black of claim 1, wherein said chemical group is attached $Ar(CH_2)_q S_k (CH_2)_r Ar'$, wherein Ar and Ar' are the same or different and are arylene or heteroarylene; k is an integer from 1 to 8; q is an integer from 0 to 4; and r is an integer from 0 to 4.

22. The modified carbon black of claim 1, wherein the carbon black is not graphitized.

23. An elastomeric composition comprising the modified carbon black of claim 1 and at least one elastomer.

24. An article of manufacture comprising the elastomeric composition of claim 23, wherein said article is a tire or a component thereof.

25. A method to improve abrasion resistance in an elastomeric composition comprising introducing at least one modified carbon black of claim 1 into said elastomeric composition prior to curing.

26. A method to improve hysteresis in an elastomeric composition comprising introducing at least one modified carbon black of claim 1 into said elastomeric composition prior to curing.

27. A method to improve abrasion resistance and hysteresis in an elastomeric composition comprising introducing the modified carbon black of claim 1 into said elastomeric composition prior to curing.

* * * * *